US012271652B2

(12) United States Patent
Warren et al.

(10) Patent No.: US 12,271,652 B2
(45) Date of Patent: Apr. 8, 2025

(54) FRAMEWORK FOR HANDLING SENSOR DATA IN A SMART HOME SYSTEM

(71) Applicant: Zuma Array Ltd., London (GB)

(72) Inventors: Morten Warren, Oxshott (GB); Ed Rose, London (GB); John Daniell Hebert, London (GB)

(73) Assignee: Zuma Array Ltd., London (GB)

( * ) Notice: Subject to any disclaimer, the term of this patent is extended or adjusted under 35 U.S.C. 154(b) by 212 days.

(21) Appl. No.: 17/415,706

(22) PCT Filed: Dec. 20, 2019

(86) PCT No.: PCT/GB2019/053674
§ 371 (c)(1),
(2) Date: Jun. 17, 2021

(87) PCT Pub. No.: WO2020/136369
PCT Pub. Date: Jul. 2, 2020

(65) Prior Publication Data
US 2022/0066730 A1    Mar. 3, 2022

(30) Foreign Application Priority Data

Dec. 24, 2018 (GB) ...................................... 1821197
Jul. 3, 2019 (GB) ...................................... 1909590

(51) Int. Cl.
G06F 3/16 (2006.01)
F21V 23/04 (2006.01)
(Continued)

(52) U.S. Cl.
CPC .......... G06F 3/162 (2013.01); F21V 23/0442 (2013.01); H04R 1/023 (2013.01);
(Continued)

(58) Field of Classification Search
CPC ........ H04R 1/023; H04R 1/025; H04R 1/028; H04R 3/00; H04R 2201/021; G06F 3/162; F21V 23/0442; H05B 47/19
See application file for complete search history.

(56) References Cited

U.S. PATENT DOCUMENTS 9,807,484 B2 * 10/2017 Starobin ................. G06F 3/162
10,310,464 B1 * 6/2019 Lu .......................... G05B 15/02
(Continued)

*Primary Examiner* — Jason R Kurr
(74) *Attorney, Agent, or Firm* — Steven Stupp

(57) ABSTRACT

A kit of parts is provided comprising a light and/or loudspeaker fitting for a smart home system. The light and/or loudspeaker fitting comprises a lighting component and/or a loudspeaker; a sensor data input interface; and a processor. The kit of parts further comprises a sensor module comprising a sensor data output interface; and one or more sensors. The light and/or loudspeaker fitting and the sensor module comprise complementary fastening means configured to detachably couple the sensor module to the light and/or loudspeaker fitting so that the sensor data output interface of the sensor module is in communication with the sensor data input interface of the light and/or loudspeaker fitting when the sensor module is coupled to the light and/or loudspeaker fitting, so as to form a sensor interface between the sensor module and the light and/or loudspeaker fitting.

21 Claims, 25 Drawing Sheets

(51) Int. Cl.
*H04R 1/02* (2006.01)
*H04R 3/00* (2006.01)
*H05B 47/19* (2020.01)

(52) U.S. Cl.
CPC ............ *H04R 1/025* (2013.01); *H04R 1/028* (2013.01); *H04R 3/00* (2013.01); *H05B 47/19* (2020.01); *H04R 2201/021* (2013.01)

(56) References Cited

U.S. PATENT DOCUMENTS

| | | | |
|---|---|---|---|
| 10,408,445 B1* | 9/2019 | Hsu | F21V 33/0056 |
| 2005/0065740 A1* | 3/2005 | Raykar | H04R 5/02 |
| | | | 703/19 |
| 2013/0028463 A1* | 1/2013 | Baker | H04R 1/025 |
| | | | 381/391 |
| 2016/0309246 A1* | 10/2016 | O'Keeffe | H04W 4/70 |
| 2016/0334082 A1* | 11/2016 | Chen | G08B 5/36 |
| 2019/0281374 A1* | 9/2019 | Proni | H04R 7/16 |
| 2020/0007968 A1* | 1/2020 | Calisi | H04R 1/028 |
| 2020/0124270 A1* | 4/2020 | Spencer | F16M 13/027 |

\* cited by examiner

FRAMEWORK FOR HANDLING SENSOR DATA IN A SMART HOME SYSTEM

CROSS REFERENCE TO RELATED APPLICATIONS

This application claims priority under 35 U.S.C. § 371 to International Patent Application No. PCT/GB2019/053674, "Framework for handling sensor data in a smart home system," by Morten Warren, et al., filed on Dec. 20, 2019, which claims priority to U.K. Patent Application No. 1909590.0, "Framework for handling sensor data in a smart home system," by Morten Warren, et al., filed on Jul. 3, 2019 and U.K. Patent Application No. 1821197.9, "Framework for handling sensor data in a smart home system," by Morten Warren, filed on Dec. 24, 2018, the contents of each of which is herein incorporated by reference.

FIELD OF THE INVENTION

This invention relates to smart home devices assembled from a kit of parts, a smart home system and a method of updating a smart home device in a smart home system.

BACKGROUND

Smart home systems aim to provide home services such as lighting and audio. These systems also accept user input to control these services. Some systems provide a user interface on a user's smartphone. Others accept voice commands from one or more microphones in the home.

Some smart home systems also include video cameras or motion sensors to enhance home security. However, the ways in which prior art systems can make use of the data provided by such sensors is limited.

SUMMARY

In order to address the problems with the prior art, the system of the present invention provides a light and/or loudspeaker fitting with an interchangeable sensor module for a smart home system.

According to one example of the present invention, a kit of parts is provided. The kit of parts comprises a light and/or loudspeaker fitting for a smart home system and a sensor module. The light and/or loudspeaker fitting comprises a lighting component and/or a loudspeaker. The light and/or loudspeaker fitting further comprises a sensor data input interface and a processor. The sensor module comprises a sensor data output interface and one or more sensors. The light and/or loudspeaker fitting and the sensor module comprise complementary fastening means configured to detachably couple the sensor module to the light and/or loudspeaker fitting so that the sensor data output interface of the sensor module is in communication with the sensor data input interface of the light and/or loudspeaker fitting when the sensor module is coupled to the light and/or loudspeaker fitting so as to form a sensor interface between the sensor module and the light and/or loudspeaker fitting. The sensor module is configured to transmit sensor data from the one or more sensors to the processor of the light and/or loudspeaker fitting via the sensor interface when the sensor module is coupled to the light and/or loudspeaker fitting.

Data may be exchanged in both directions via the sensor interface. For example, configuration data and control signals may be supplied from the light and/or loudspeaker fitting to the sensor module via the sensor interface.

The processor of the light and/or loudspeaker fitting may further comprise a data analysis framework comprising one or more data processing modules configured to analyse the sensor data.

Analysis of the sensor data may be performed by the processor of the light and/or loudspeaker fitting. Additionally or alternatively, sensor data may be processed by a dedicated processor on the sensor module.

The sensor module may further comprise a processor. The processor of the sensor module may comprise a data analysis framework comprising one or more data processing modules configured to analyse the sensor data.

The sensor module (smart bezel) may be used to implement microphone modules. In some configurations, the system on chip is provided on the light and/or loudspeaker fitting. In other configurations of the system architecture, the system on chip (SoC) is provided in the sensor module (smart bezel). This might mean the bezel adds the "smart" to the light and helps keep the costs of the light fixtures lower. The GU10 fixture may be retrofitted to a 6" USA ceiling fixture. In this case, the larger fixture suggests a higher light output. A light ring may be around the perimeter to increase the light and throw of the illumination.

The data analysis framework may continually process raw data from the sensors and determine when certain events have occurred. This provides the smart home device with the ability to be aware of occurrences of certain events that the analysis framework is configured to listen for. Each data processing module may be configured to listen for a particular event. Alternatively, each data processing module may be configured to process data from a particular sensor of the one or more sensors. Changes in the home environment can also be detected and the system can react to those changes accordingly in real time. There is no requirement to store all of the data generated by the sensors and the smart home device may instead store refined data or meta-data.

Audio signals may be continuously monitored via a pre-identification algorithm running in the digital signal processor resource in the Zuma head unit. This algorithm may identify sounds of interest and then pass the sound sample into the greater system including up into the cloud application for further processing and action follow up.

The system may be configured to continually record audio and store the audio in a buffer. The audio data may be processed locally as it is received (e.g. at the sensor module or the light/loudspeaker fitting) to listen for a "wake" word or phrase. When the "wake" word is encountered, the system may continue to record audio until it is established that the user has finished issuing the command. The system may then send the audio to the cloud for voice recognition processing and determining how to respond to the user's request. The data sent to the cloud for processing may include some audio stored in the buffer that was received before the wake word was encountered. This may provide context for the command that is sent to the cloud and improve the response provided by the system.

The data analysis framework may further comprise a provisioning interface. The data analysis framework may be configured to receive instructions to update the data processing modules via the provisioning interface. On receiving the instructions to update the data processing modules, the data analysis framework may be configured to:

update one or more of the data processing modules;
add one or more additional data processing modules to the one or more data processing modules; and/or
remove one or more of the data processing modules from the data analysis framework.

The provisioning interface provides the device with the ability to add new listeners for events that the user is interested in or for new sensors that the user has added to the system by interchanging the smart bezel.

The light and/or loudspeaker fitting may further comprise a mounting means configured to mount the device in an aperture in a panel.

The light and/or loudspeaker fitting may further comprise a network communication module configured to communicate with a network router and/or a network communication module of another light and/or loudspeaker fitting in the smart home system.

The sensor data input interface of the light and/or loudspeaker fitting may be a physical connector. The sensor data output interface of the sensor module may be a physical connector. The sensor data output interface of the sensor module may be in physical and electrical communication with the sensor data input interface of the light and/or loudspeaker fitting when the sensor module is coupled to the light and/or loudspeaker fitting.

The complementary fastening means may be configured to couple the sensor module to the light and/or loudspeaker fitting so that the sensor data output interface of the sensor module is in physical alignment with the sensor data input interface of the light and/or loudspeaker fitting.

The light and/or loudspeaker fitting may be configured to supply power to the sensor module when the sensor module is coupled to the light and/or loudspeaker fitting. The power may be supplied via the sensor interface.

The light and/or loudspeaker fitting may be configured to send control signals to the sensor module via the sensor interface when the sensor module is coupled to the light and/or loudspeaker fitting.

The sensor interface may be a universal serial bus, USB, interface or an Ethernet interface. Using a protocol that conforms to a widely used standard allows for flexible integration with a wide variety of sensors.

The smart bezel peripheral signals can be processed and translated to facilitate interface via Ethernet. Ethernet is a common interface to systems for home and system control in the CEDIA industry.

The smart bezel peripheral may be powered via USB or other Zuma head unit power distribution. This power may be made available via Power Over Ethernet (POE) which is common to systems for home an system control in the CEDIA industry.

The sensor module may be configured to send an identifier to the light and/or loudspeaker fitting when the sensor module is coupled to the light and/or loudspeaker fitting, wherein the light and/or loudspeaker fitting is configured to determine information relating to the one or more sensors in the sensor module, based on the identifier.

The one or more sensors may comprise one or more of:
a microphone;
a directional microphone;
a microphone array;
a smoke sensor;
a fire sensor;
a gas sensor,
a carbon monoxide sensor,
a temperature sensor (physical temperature of the room);
a lighting colour sensor (to detect the colour temperature in the room or of the light output by the device),
a motion sensor;
a video camera; and
an infra-red camera.

The list of potential sensors may include a digital camera. Cameras sensors may have IR cut filter removed to facilitate IR low light sensing. In a room configuration with multiple devices, cameras can be configured in the lighting array so that multiple simultaneously captured images can be processed via photogrammetry to create a 3d map of the scene captured. Pets, people, furniture can be differentiated using this 3d image map.

Images captured with cameras may be processed using machine learning algorithms for image processing to facilitate rapid identification and differentiation of people, pets, household vs. unknown people and other features relevant to security and health.

Machine learning and image processing algorithms may be run in specialized hardware optimized for processing "running" arrays of neural network weights representing deep learning processes.

The list of potential sensors may include structured light and camera sensors to facilitate 3d data capture. Pets, people, furniture can be differentiated using this 3d data map.

The list of potential sensors may include distance sensors using time of flight sensing electronic components. In a room configuration with multiple devices, these point distance sensors can be used and processed as an array to develop a 3d sensing image. Pets, people, furniture can be differentiated using this 3d image map.

The list of potential sensors may include WiFi sensors. Advanced processing can be applied to WiFi signals received at the WiFi sensors to track people and pets. WiFi signals fill the room with a field of 2.4 and 5 GHz radio signals. When people and pets move, this field is distorted because the moving bodies reflect and refract the radio waves. The WiFi sensors may be used to detecting changes in signal strength of WiFi signals in various locations in the rooms. This data may be used to determine the locations of moving objects in the room.

The list of potential smart bezel sensors may include doppler radar sensors and processing to facilitate heart rate and breathing rate sensing in the room. The technique may employ mm-wave FMCW (Frequency Modulated Continuous Wave) radar for remote capture of vital signs. The sensors may be used to keep track breathing and heart rate of the occupants of the room. This may be particularly advantageous as a method of sleep monitoring. These sensors could also detect unexpected activity, such as restlessness or seizures, or be used in care homes and the like.

There are a number of categories of sensors that may be useful in the smart home system. These include:
Life/safety—gas, heat etc.
Cameras—IR, fisheye, Forward Looking Infrared Radiometer (FLIR), Thermopile, Thermopile arrays (FLIR), other types also possible
Motion sensors
Microphone arrays that can be processed by local and group DSP
DSP algorithms that work across the mesh (which may be provided as part of the sensor data analysis framework).

The sensor module may be in the form of a bezel that surrounds the lighting component and/or loudspeaker of the light and/or loudspeaker fitting when the sensor module is coupled to the light and/or loudspeaker fitting.

The bezel may further comprise lighting components that are controllable by the light and/or loudspeaker fitting via the sensor interface when the sensor module is coupled to the light and/or loudspeaker fitting.

The bezel may further comprise a physical interface port. Communications received at the physical interface port may be relayed to the processor of the light and/or loudspeaker fitting via the sensor interface when the sensor module is coupled to the light and/or loudspeaker fitting.

The one or more sensors may be configured to continuously transmit sensor data when the sensor module is coupled to the light and/or loudspeaker fitting.

The light and/or loudspeaker fitting may comprise a network communication module configured to communicate with a network router and/or another device in the smart home system.

The complementary fastening means may comprise one or more magnetic elements on the sensor module or the light and/or loudspeaker fitting. The magnetic elements may be configured to operate with one or more corresponding elements on the light and/or loudspeaker fitting or sensor module respectively. The magnetic elements may be magnets. The corresponding elements may also be magnetic elements, such as magnets.

In another example of the present invention, a smart home system comprising a one or more smart home devices is provided. Each smart home device comprises a light and/or loudspeaker fitting and a sensor module from the kit of parts described above. The sensor module is coupled to the light and/or loudspeaker fitting.

The smart home system may comprise a plurality of smart home devices. The smart home devices may all be in communication with each other. The devices may all be in direct communication with each other or may communicate via a network. For example, the devices may assemble into a mesh network.

One example network configuration for the smart home system is a WiFi connection to the Master smart home unit (the home coordinator unit). A second (e.g. proprietary) radio connection may be used to stream audio from the Master smart home unit to multiple other units. By using a hub and spoke network using a secondary connection, the secondary connection may be time synchronized to the sample level. Time synchronization is critical to DSP for audio functions. For any local DSP of the audio, sample alignment is required to make sure the DSP in each location is operating on the same sample timing. Other systems that use WiFi are synchronized to around 5 ms. This system has 1 ms sync. In one example implementation, a separate DSP module is not provided on each device, rather the DSP is provided in the SoC of the Master (or home coordinator, room coordinator etc.). This achieves benefits of having same hardware on all units (which reduces the manufacturing complexity). The two radio modules (WiFi and the second radio connection) may both be available on this single SoC module on the Master unit. The sync may be achieved with a secondary radio sync pulse (although this is not required). Sync may be possible using WiFi technology in future implementations (e.g. it may be on the roadmap from groups like WISA). The systems may be connected to each other using an industry standard feature called "Multi-room" which has the millisecond level sync.

There are further advantages of providing the same hardware on all units. If only one hardware design is required then only one unit requires manufacturing. In a high volume this simplifies the manufacturing logistics through manufacturing and distribution because the same unit goes to every end point in the logistics path. As a final step the hardware is provisioned for its final use: e.g. master, satellite or light only.

The one or more smart home devices may include a first smart home device and a second smart home device. The processor of the light and/or loudspeaker fitting of the first smart home device may further comprise a data analysis framework comprising one or more data processing modules. Each data processing module may be configured to analyse the sensor data received via the sensor interface of the first smart home device. The second smart home device may be configured to transmit sensor data received from the one or more sensors of the sensor module of the second smart home device to the first smart home device. The processor of the first smart home device may be further configured to receive and analyse the sensor data transmitted by the second smart home device.

The processor of the light and/or loudspeaker fitting of each of the one or more smart home devices may further comprise a data analysis framework comprising one or more data processing modules configured to analyse the sensor data received via the sensor interface of the respective smart home device.

The one or more smart home devices in the smart home system may be configured to each analyse the data from their respective sensor modules. Alternatively, sensor data may be passed to another device in the system for analysis. Advantageously, the network load is smaller if the devices each analyse their own sensor data.

Each smart home device may further comprise a network communication module configured to communicate with a network router. One or more of the data processing modules may be configured to analyse the sensor data by:
  generating refined data from the sensor data;
  sending the refined data to a data analysis service via the network router; and
  receiving analysis data from the data analysis service.

The refined data transmitted to the data analysis service may be anonymised, encrypted or sent service using a secure channel. This allows the Zuma devices to make use of more powerful functionality while protecting user's data. The data-analysis service may be a third-party data analysis service.

The network router way be a wireless network router (for example an 802.11 WiFi router). Communication with the router can be either direct or indirect. For example, if a smart home device is not within range of the router, it may communicate with the router via another device in the smart home system, where the other device acts as a relay or a repeater.

Alternatively, the data processing module can analyse the sensor data using code executing in the data processing module.

The one or more data processing modules may be configured to generate one or more events based on the analysed sensor data.

Each event may comprise one or more of:
  an identifier;
  an event type;
  a portion of the sensor data;
  meta-data based on the analysed sensor data; and/or
  a pointer to multi-media data stored in a mass storage device in the smart home system.

Each event of the one or more events may be passed onto an event bus after it is generated.

The system may further comprise a data store. The system may be configured to store the one or more events in the data store.

Each event may comprise an event type. A first event of the one or more events may have an event type selected from the list comprising:
voice command;
glass break;
baby cry; and
dog bark.

The one or more smart home devices may be arranged in a hierarchy. One of the smart home devices may be designated as a home controller unit at the apex (or root or hierarch) of the hierarchy.

One or more of the smart home devices may be designated as a sub-controller unit at the apex (or root) of a branch (or subsection) of the hierarchy, wherein each sub-controller unit is directly below (is a child of) the home controller unit or another sub-controller unit in the hierarchy.

One or more of the smart home devices may be designated as a slave unit. Each slave unit may be directly below (may be a child of) a sub-controller unit or the home controller unit the in the hierarchy. The processor of each slave unit may comprise a respective data analysis framework.

The processor of each slave unit may be configured to generate one or more actions based on a first event generated by a data processing module of the one or more data processing modules of the respective data analysis framework.

The processor of each sub-controller unit may be configured to generate one or more actions based on a second event generated by a data processing module of a data analysis framework of a processor of a smart home device in the branch (or subsection) of the hierarchy of which the sub-controller unit is the apex. In other words, the second event is generated by a descendent of the sub-controller.

The processor of the home controller unit may be configured to generate one or more actions based on a third event generated by a data processing module of a data analysis framework of a processor of a slave unit in the hierarchy.

The slave unit must be a descendant of the home controller unit because the home controller unit is the apex of the hierarchy. A device can have more than one designation. For example, a sub-controller unit (e.g. a room controller unit) may also be a slave of the home controller unit.

The processor of each sub-controller unit may be configured to receive a fourth event generated by a data processing module of a data analysis framework of a processor of a smart home device in the branch (or subsection) of the hierarchy of which the sub-controller unit is the apex. In other words, the fourth event is generated by a descendent of the sub-controller. The processor of the sub-controller unit may be further configured to transmit the fourth event to its parent in the hierarchy (the device which is directly above the respective sub-controller unit in the hierarchy). The parent device will be either the home controller unit or another sub-controller unit.

The home controller unit may further comprise a network communication module configured to communicate with a network router. The processor of the home controller unit may be configured to receive a fifth event generated by a data processing module of a data analysis framework of a processor of a smart home device in the hierarchy. The processor of the home controller unit may be further configured to transmit the fifth event to a data analysis service accessed via the network router. The processor of the home controller unit may be further configured to receive one or more actions generated by the data analysis service based on the fifth event. Alternatively, the processor of the home controller unit may be further configured to receive meta-data from the data analysis service and generate one or more actions based on the received meta-data.

The event transmitted to the data analysis service may be anonymised, encrypted or sent using a secure channel. This allows the devices to make use of more powerful functionality while protecting the user's data. The data-analysis service may be a third-party data analysis service.

The home controller unit may be further configured to determine that the fifth event requires a prompt response and promptly transmit the fifth event to the data analysis service.

The home controller unit may be further configured to receive a sixth event generated by a data processing module of a data analysis framework of a processor of a smart home device in the hierarchy, determine that the sixth event does not require a prompt response and store the sixth event in a data store.

The home controller unit may be further configured to receive a seventh event generated by a data processing module of a data analysis framework of a processor of a smart home device in the hierarchy, wherein the sixth and seventh events are received by the home controller unit at different times;
store the seventh event in the data store;
transmit a batch of events from the data store to data analysis service, the batch of events comprising the sixth and seventh events.

The actions may comprise one or more of:
adjust a brightness of one or more lighting components;
adjust a colour temperature one or more of lighting components;
adjust an audio playback volume of one or more loudspeakers;
adjust audio equalizer settings of one or more loudspeakers;
send an electronic message to a user of the system;
send an electronic message to group of users;
play an audio message at one or more loudspeakers;
play multi-media data at one or more loudspeakers, wherein the multi-media data is stored in a mass storage device in the smart home system at a location defined by a pointer in the respective event; and
generate another event.

The actions may comprise one or more of:
One event may be analysed and another event may be generated as a result (instead of or as well as an action). This may be is useful if the entity performing the analysis determines that event is a sub-event type of the original event or is actually different to the event type that was originally reported. For example, a "voice command" with audio data may be generated by a slave unit and sent to a room controller unit. The room controller unit may determine that the audio does not respond to a voice command but actually a dog bark. This room controller unit may then generate a dog bark event and send this event to the home controller unit.

The home controller unit may be configured to receive an electronic message from a user and generate one or more actions based on the received electronic message. The message may be sent from an individual user or may originate from a group conversation including the home controller and multiple users.

Generating one or more actions based on the received electronic message may comprise using machine learning to determine a most probable preferred action based on one or more of:

language content of the electronic message;
a determination of an identity of the user that sent the message (also can be determined for a voice command); and
training and/or historical data associated with the user.

Generating one or more actions based on an event may comprise using machine learning to determine a most probable preferred action based on an operational context. The operational context may be determined based on historical event data.

The processor that generated the action may be configured to perform the action by generating control signals to adjust the operation of the lighting component and/or loudspeaker of the respective smart home device. The action may also be performed using other components associated with the device.

The processor that generated the action may be the processor of a sub-controller unit or the home controller unit. The processor may be configured to perform the action by generating control signals to adjust the operation of the lighting component and/or loudspeaker of one or more smart home devices that are subordinate in the hierarchy to the sub-controller unit or home controller unit that generated the action. For example, a room controller may receive a voice command event, determine that the command is to dim the lights, and send control signals to all the lighting devices in the room to dim their individual lighting levels.

The system may further comprise one or more third party devices configured to respond to control signals, wherein the processor that generated the action is configured to perform the action by generating control signals and sending the control signals to the one or more third-party devices.

Each data analysis framework may further comprise a provisioning interface. When instructions to update the data processing modules are received via the provisioning interface, the data analysis framework may be configured to:
update one or more of the data processing modules;
add one or more additional data processing modules to the one or more data processing modules; and/or
remove one or more of the data processing modules from the data analysis framework.

Each smart home device may further comprise a network communication module configured to communicate with a network router and/or a network communication module of another smart home device in the smart home system. Each of the one or more smart home devices may be configured to communicate with one or more other devices of the one or more devices so that the devices form a network of devices where each device can communicate (either directly or indirectly) with any other device.

The smart home devices may be configured to self-arrange to form a mesh network.

The network communication module of each smart home device may be configured to access the internet via the network router (either directly or indirectly).

The network communication module of one of the one or more devices may be configured to access the internet via another device of the one or more devices.

In another example of the present invention, a method of updating a smart home device in a smart home system is provided. The smart home device comprises a light and/or loudspeaker fitting and a sensor module from the kit of parts described earlier. The sensor module is coupled to the light and/or loudspeaker fitting. The processor of the light and/or loudspeaker fitting further comprises a data analysis framework comprising one or more data processing modules configured to analyse the sensor data from the respective sensor module. The data analysis framework further comprises a provisioning interface. The method comprises receiving, at the processor, instructions to update the data processing modules via the provisioning interface. The method further comprises, in response to receiving the instructions to update the data processing modules:
updating one or more of the data processing modules;
adding one or more additional data processing modules to the one or more data processing modules; and/or
removing one or more of the data processing modules from the data analysis framework.

The method may further comprise uncoupling (by a user of the system) the sensor module from the light and/or loudspeaker fitting. The method may further comprise (by a user of the system) coupling a replacement sensor module to the light and/or loudspeaker fitting. The method may further comprise sending (by the replacement sensor module) an identifier from the replacement sensor module to the light and/or loudspeaker fitting. The method may further comprise (by the processor of the light and/or loudspeaker fitting) determining information relating to the one or more sensors in the replacement sensor module, based on the identifier. The method may further comprise (by the data analysis framework on the processor of the light and/or loudspeaker fitting) requesting, via the provisioning interface, instructions to update the data processing modules, based on the information relating to the one or more sensors.

According to another example of the present invention a smart home system comprising one or more devices is provided. Each device comprises a sensor interface. The sensor interface is arranged to receive sensor data from one or more sensors. The system further comprises a controller comprising one or more data processing modules arranged to receive and analyse the sensor data.

The data processing modules may generate events based on the analyzed sensor data. The controller may perform actions based on the events. The controller may be a part of one of the one or more devices. The smart home system may further comprise a provisioning interface so that the listeners can be updated and new listeners can be added/removed in response to availability of sensors and user preferences. Each device may comprise one or more of:
A lighting component;
A loudspeaker component; and
One or more sensing components.

The system may further comprise a provisioning interface. The system may be arranged to: update one or more of the data processing modules; and/or add one or more additional data processing modules to the one or more data processing modules, when instructions to update the data processing modules are received via the provisioning interface.

The Zuma system provides a framework allowing new sensors to be added to the system, without requiring modification of the existing framework. These sensors can be added by swapping the decorative bezel around the lighting and/or speaker devices in the Zuma system.

The framework provided by the Zuma system also allows software modules to be added to the system. These could in some examples be third-party software modules. These modules analyse the sensor data and provide the smart home system with an awareness based on the raw data collected by the sensors.

The addition of sensors and sensor processing and a dynamically configurable system provides advantages. The Zuma "Smart Bezel" system provides a framework for converting large quantities of continuous raw sensor data from a variety of sensors into events on which the system can act. This is performed by a variety of data processing modules (or "listeners") that can be third-party modules. The user's data is kept secure by only sending data to the cloud where necessary, using secure tunnels to do so and/or anonymising the data. The features that enable the Zuma system to operate in this way are:

The smart bezel including a number of sensors

Sensors can be easily added to/removed from the system by replacing the bezel

The sensors continuously generate raw sensor data that is sent to the Zuma

The combination of hardware and software that creates a powerful integration

The Zuma SDK that includes

A number of applications ("listeners") that continuously process the raw data and generate event data that can be acted on A provisioning interface so that the listeners can be updated and new listeners can be added/removed in response to availability of sensors and user preferences On top of this framework, a number of additional features enhance the functionality of the system:

A local secure network allows the Zuma devices to share information with each other A secure interface with the Zuma cloud allows the Zuma devices to make use of more powerful functionality while protecting user's data A group chat feature allows the users and the system to interact naturally Machine learning can be utilised to Identify users and react personally Operate in different modes depending on context cues The challenge is to implement and support a two-tier hardware and cloud system with respect to data and time synchronization as well as a unified event bus that is synched across hardware and clouds. The Home signal processing into the integration of speaker and light located across the ceiling in multiple locations is a unique situation. Implementing a system that can be flexibility configured under a secure and flexible data logging and event/action framework will unlock and provide commercial advantage over more fixed system implementations.

CLAUSES

1. A smart home system comprising:
   one or more devices
      each device comprising a sensor interface, wherein the sensor interface is arranged to receive sensor data from one or more sensors
   a controller comprising one or more data processing modules configured to receive and analyse the sensor data.
2. The smart home system of clause 1, wherein the one or more data processing modules are configured to generate events based on the analyzed sensor data.
3. The smart home system of clause 1 or clause 2, wherein the controller is configured to perform actions based on the events.
4. The smart home system of any preceding clause, wherein controller is a part of one of the one or more devices.
5. The smart home system of any preceding clause, further comprising a provisioning interface, wherein the system is arranged to:

update one or more of the data processing modules; and/or add one or more additional data processing modules to the one or more data processing modules, when instructions to update the data processing modules are received via the provisioning interface.

BRIEF DESCRIPTION OF THE DRAWINGS

The present invention may be put into practice in a number of ways, and some specific examples will now be described with reference to the following drawings.

DETAILED DESCRIPTION

Figure 1:
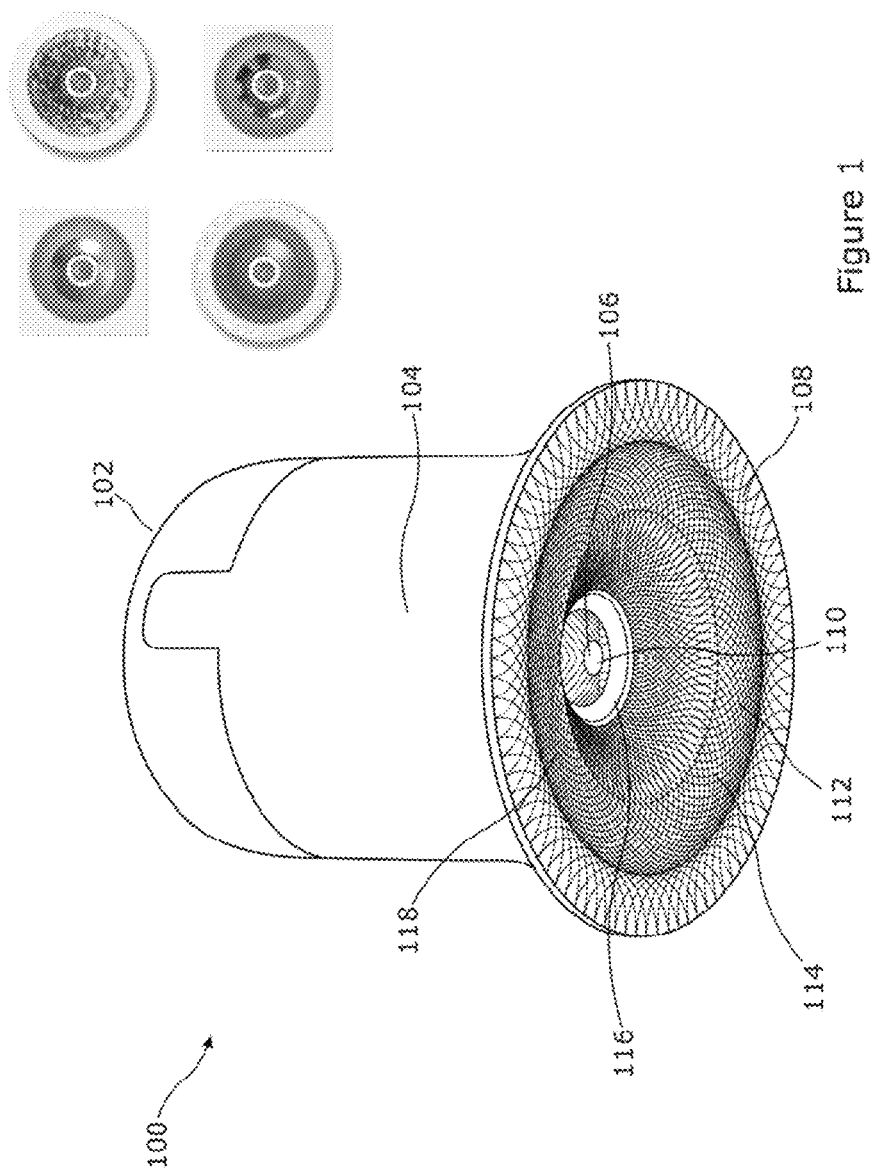
FIG. 1 is a diagram of a smart home device showing some of the functionality of the device.

A number of specific examples will now be described by way of example.

One example of a software module that can be used to analyse the sensor data is an audio analytic (audio processing) module. Third party audio processing modules may be used.

For other types of sensor, many different data processing modules can be installed.

The data may be analysed at the devices that include the sensors (e.g. the lighting and/or audio devices). Alternatively, data may be sent to a room controller unit or a home controller unit in the smart home system. Analysis of the sensor data can then be performed at any level in a hierarchy of the smart home system.

On the basis of the data analysis, actions may be created for the smart home system to perform. Alternatively, the smart home system may inform users of certain events, based on the analysis of the sensor data.

The software modules that enable the system to analyse the data may be updated from time to time. The Zuma system allows updates to be provided to the data processing modules (e.g. individual devices, room controller, home controller and the like). Moreover, new data processing modules can be added to the system. The ability to update the capabilities of the system in this way, without requiring installation of new hardware, provide a flexible system.

Updates may be instigated by a user (for example, adding new functionality to the system), may be instigated by providers of the Zuma system (e.g. to provide security updates) and/or may be instigated by providers of data analysis modules to update the performance of these modules.

Smart Bezel

Recessed luminaires typically have a bezel that is used to create an unique aesthetic appearance for a particular luminaire style and to cover both the generic functional part of the luminaire and the hole that has been cut in the ceiling to fit the recessed luminaire. The "finishing" step of installing the bezel can be done after the luminaire has been installed and approved by the building inspectors.

In the case of Zuma we aim to integrate a wide number of features into the form factor of a recessed luminaire. It would be convenient and helpful for many reasons to be able to selectively add features after the recessed part of Zuma has been permanently installed into the ceiling.

Manage the overall cost of goods and cost to our end customer by moving features that are not necessary for every unit into the bezel. For example
Sensors (ex. smoke/fire, cameras, IR cameras, microphones and microphone arrays.
Additional Lighting (ex. light ring for high output 6" USA recessed fixture)
Service connectors (ex. Ethernet or USB connectors to Zuma control unit. Used to access during service calls so that it is not necessary to remove the zuma unit from the ceiling)
Smart home modules (ex. Zigbee or other smart home modules that are not part of the current zuma system.

We are unaware of any system that does similar. There exist in the market ceiling mounted intelligent sensors and system but these are not implemented as part of a bezel to a luminaire or a recessed unit.
The smart bezel solves a unique and situated (to the Zuma functions) solution to address the goals outlined above.
Key features of smart bezel:
Attaches to the front flanged of the recessed Zuma unit. This attachment can be accomplished in a variety of ways. We are currently using magnets.
A connector that connects the Zuma control electronics to the smart bezel electronics.
Power (sufficient power to drive LED) to the smart bezel electronics.
Control signals to the smart bezel
Data signals to and from the smart bezel and Zuma control unit.
Among typical solutions, USB (v1, v2, v3) will bring advantages. We can leverage commodity solutions for Cameras, Microphones, Ethernet, IoT etc. that are built on top of the USB standard.
In some constructions of the Zuma speaker assembly, signal cables are required to be run from the smart-bezel to the rear of the speaker assembly housing and in some cases out through the rear of the cabinet to a separate control PCB assembly. The length of this signal path is susceptible to EMI noise injection and presents a potential challenge for EMC. One embodiment of the smart speaker assembly is to use USB as the data transport of data from the smart bezel. Standard USB hardware implementations address issues of EMI and EMC and compress the data transport wiring to only a few wires.
Plug and play configuration. A unique identifier in the bezel will communicate the functions of the bezel to the Zuma controller and this information will allow the system to automatically configure itself to use the function of the smart bezel.
The Smart Bezel is a flexible way to add new functions to the Zuma system over time but also specifically for unique installations of Zuma that may result from work with customers (for example an installation in a hospital where Zuma needs to be adapted to work with existing hospital plant/IT equipment). Smart bezel is likely to impart commercial advantage due the flexibility and decoupling of install and provisioning/customization post-installation.
The key features of the "Smart Bezel" Diagrams:
Variable thickness of bezel can accommodate a wide range of internal components and electronics.
Light and sound from luminaire can pass through the smart bezel
Sensors can be hidden behind a mesh on the bezel cone to conceal sensors from view.
Where appropriate sensors and LEDs can be concealed behind selectively thinned plastic in the bezel to hide them from sight.
Connector and alignment features facilitate signal pathway between smart bezel electronics and Zuma control electronics.
The smart bezel connector can be implemented in a fashion to facilitate a low profile bezel. One side of this connector may be contacts on the PCB and the mating connector may be low profile spring contact pins.
Corresponding connectors on the bezel and zuma device are provided for the signal pathway. Multiple corresponding pairs of connectors may be mounted symmetrically around the bezel/zuma device. Each of the connectors on the bezel may be identical, as may the corresponding connectors on the zuma device (e.g. on the flex cable assembly) This can be used to simplify the installation of the front bezel so that it is not necessary to select a single rotational orientation of the bezel.
Signal pathway to Zuma electronics passes in similar manner as lighting and tweeter signals (via flex circuit)

Specific Embodiments

Zuma Introduction

Zuma is a light and audio product designed to bring premium illumination and entertainment experience into living environment. Zuma is built to last a lifetime, creating an authentic atmosphere by naturally fitting into the ceiling space. This combined with additional features such a voice assistant, sensors and connectivity, enables a unique experience of simplicity and sophistication.

Zuma is a recessed lighting fixture designed to be easily installed by a licensed electrician, designed to elegantly build-in and hide multiple smart home appliances. Once installed Zuma is a high-fidelity multi-speaker audio system with integrated voice control (Alexa, Google Home, etc.) that integrates with existing smart home controls or stands on its own as a smart home hub. From its vantage point in the ceiling, Zuma can easily sense people within the room and these along with other sensor signals can be translated to software applications for home automation and in the future, security, energy management and health telepresence.

Market Landscape
- User Experience and integration is poor across existing product categories of voice controlled smart speakers, smart speakers (with media streaming), smart-home control (lighting, switches, sensor) and Smart-Home hubs.
- Setup is difficult and confusing across the board
- Most integrated solutions do not work together seamlessly
- It's difficult to know at time of purchase whether or how a device will work with your existing system
- Functionality or lack thereof is often baffling to users
- There are good audio solutions but no great ones
- There are good lighting solutions but no great ones
- It is difficult to get clarity on how any individual solution will integrate with other smart home devices and platforms because the technological and strategic landscape is so fluid
- Changes are occurring so quickly that many purchases become obsolete before the end of their useful life without upgrades or new equipment Market Requirements
Differentiation
- Zuma combines features from multiple smart-home categories and combines them all in a simple kit of beautiful, high-design, flush mount ceiling light fixtures. Zuma's integrates with voice controlled smart speakers (with media streaming) and smart-home control (lighting, switches, sensors and hubs).
- Zuma emphasizes user-experience simplicity with a preference for fewer better executed features. This results in a product that is easier to understand, install and use and that makes sense from a simple installation with a few Zuma units to a complex custom installation with multiple rooms and multiple Zuma units per room.
- Zuma is differentiated from existing products:
- Highest quality integrated lighting and audio with voice and app control.
- Disappears into existing lighting fixtures eliminating unsightly clutter in the room and on the ceiling
- Industry leading user experience with award winning high-design, international recognition.
- Simplifies the installation and cognitive load of the smart home system
- Futureproofed home infrastructure: a platform delivered in a consumer electronics format.
- Extensible sensor platform aligned with the vision of the truly smart home of the future.
- Can be installed by an electrician. "It's just a light fixture"
- Lower "Total Cost of Ownership" (TCO) than competing smart home devices Many functions disguised as a GU10 light fitting (as a replacement or new installation)
- Invisible Sound
  - High Fidelity Multi-Speaker Sound Output hidden behind the light fixture.
- Light
  - Premium high design/architectural look, supports health and wellbeing of occupants, commercial grade performance, High CRI, variable colour temperature lighting.
- Voice Control (Alexa)
  - Media Playback
  - Voice controlled computing
  - Telephony
  - Intercom
- Media player/streamer
  - High bit rate audio from any Apple or Android app can play over Wifi
  - Stand alone high bit rate media streaming such as Spotify connect and Tidal
- Microphones
  - Farfield microphone array enables voice control, intercom and telephony
  - Microphone array and digital signal processing enables event detection (eg for local processing software could be licenced from Audio Analytics or similar). Microphone array can carry out intelligent sound sensing (deep learning triggers) AND high-performance audio signal processing.
- Sensors
  - Temperature sensors—eg IR to detect heat on surfaces in a room
  - Humidity sensors
  - Fire, smoke and gas sensors
  - Motion (eg IR)—global—to detect movement in a room
  - Sound sensors
  - Video or still cameras:
  - Lens-Fisheye to cover whole room or focused on specific location
  - Local image processing can detect events using pattern recognition send events
  - Can send images and video to control system for storage and retransmission to Cloud Database
  - FLIR camera sensors to detect heat map in room Thermopile, Thermopile arrays (FLIR), other TBD
  - Type of activity and location of event in room.
  - People and pet sensors (differentiate)
  - Zigbee and/or other IoT or security connection radio
- High Quality Audio
  - High quality audio experience that is distinct and better than what is considered the best today.
    - Apple Homepod
    - Sonos
    - Alexa
    - Harmon Kardon
    - Bose
    - Etc.
  - Will win product of the year in hi-end audio press
    - Absolute Sound
    - What Hi-Fi
    - Etc.
- Voice Control
  - Alexa or Google home like voice control
- App Control
  - Plays all iOS and Android audio sources as well as leading streaming services like Spotify.

Sophisticated DSP takes advantage of speaker and microphone arrays on ceiling
    Sample level high bit rate audio transfer allows DSP in each light fitting to be synchronized across the room
    DSP room characterization utilizing array configuration of microphones allows for a variety of audio effects including: sound focusing
    Surround sound for media playback
High Quality Lighting
  High quality light
    Bright, High CRI, No flicker
  Color Temperature
    Adjustable for mood and health
  Control
    Works with existing switches
    Works with smart-switches
  Adaptive/Personal
    Directional control of lights through app or voice commands (task lighting, reading light etc)
  Complex scenes
    Ability to set different colours for lights within a single group for a scene (not possible with Hue/Alexa, Homekit etc.)
  New lighting experiences
    Light can interact with media and sensors to deliver interesting new multi-media experiences
  Home security
    Light sequences can simulate appearance of people being at home OR flash all the lights in the house as part of alarm.
  Value & Performance
    High quality lighting that is good enough to be recognized by professionals and consumers yet recognizes and delivers great value by leveraging advances in the LED lighting industry
Hardware Platform (not just a product but a compelling reason to install this into your home)
  Future proof Can adapt to new technologies and changing requirements on a home infrastructure timescale.
  Voice Control Options (not locked in to one vendor)
    Cartridge strategy can work in all popular smart home ecosystems AND can support a Zuma-branded smart home ecosystem.
  Extensible sensor platform
    For new/better applications and services
  Local sensing/processing resources.
    Digital signal processing, Local deep learning/AI
  Embedded in ceilings
    Does not occupy otherwise useful space within the home
  Invisibly powered
    Does not require power cords or outlets.
    Power management for sensing local to USB power.
  Sensors and output (sound and light) integrated into a single package
    High design, no added 'things' (clutter) to enable a wide range of smart home functionality
  Eliminates Clutter
    Meets the highest EU standards for commercial and residential lighting with added functionality (programmable directional lighting)
Software Applications Platform (compelling features and strategic value for partners)
  Consumer and Commercial applications
    New consumer features and functions added via software update or via app store
    Commercial applications via partners such as home energy management, health care and security, consumer data.
  Can exist within any Smart Home ecosystem. Can control and be controlled by platforms (Alexa, Google Home etc) AND can control 'dumb' smart home devices (Hue lights, August locks, Nest, Ring etc)
  Consumer (Apple Homekit, Samsung Smart Things), CEDIA (Control4)
    Works with existing Smart Home platforms and devices
  Home Security
    Embedded sensor arrays can detect home intrusions, smoke/fire and other anomalies
  Home Health Monitoring
    Embedded sensor arrays can detect home appliance malfunctions (mic/refrigerator compressor failure, leaking faucets, humidity/leaks etc)
  Elder Care/Aging in place
    Monitoring of movement and daily activities like entries and exits, caregiver visits, length of sleep, fridge openings (eating), bathroom use, falls, cries for help etc
  Applications based on robust data sets from sensor arrays
    Enhance the above-mentioned applications, partner with Google et. al. and create new (undetermined but non-creepy) applications.
    Computation for Neural Network runner on device.
One design addresses multiple user needs
  Consumers
    Compelling smart-home offering, future proofed infrastructure
    DIY enabled installation. Low barrier to entry.
    Extensible. Low cost to try and then add on.
    Applications enable an exciting journey to the future.
    Enables support of remote family member interactions.
  Real Estate Developer
    New sales feature, low cost install avoids custom install costs because it can be installed by electrician only
  Electricians
    Installs and tests like a light, no work to add sophisticated features, adds a lot of features that consumer can enable on their own
  CEDIA Installers
    Works with Apple Homekit and control 4, very simple to install and set up.
  Partners
    Extensible hardware and software platform allows for a wide range of quick customizations.
    Passive people sensors deliver high quality data.
    Local processing and media capabilities enable high touch customization.
Software
  Integration of Light, Sound, Sensors to fit into small light fixture
    Tweeter/Driver configuration
    Heat dissipation
    LED configuration
    Microphone configuration
    Sensor configuration
  Voice Cartridges
    Enable simultaneous multiple voice control functions
  Remote temperature sensing
    PIR based remote temperature sensing
  Light switch
    Enable smart functions using existing conventional light switches Updating
  Over the air update of firmware on USB.
  Encrypted/secure firmware update installation and configuration.
  Dynamic sensor driver install/update on device
  Encrypted/secure driver installation and configuration.
Zuma Marketing Requirements
  Zuma is designed to operate as a stand-alone smart home Audio and Lighting solution that matches the basic functionality of existing Smart Home Audio (Sonos) and Lighting solutions (Hue), limited to recessed lighting applications initially. It will also function as a smart home device within the Alexa and/or Google Home ecosystems leveraging all of those capabilities. In addition, it supports audio streaming from mobile devices.
High Fidelity Audio
  Full Range high fidelity drivers
    Mid and high frequency drivers with crossover
  High Fidelity Digital Audio
    All digital audio path: lossless, high bit rate, with digital to analogue conversion occurring in last stage via digital (D-Class) high performance power amplifier.
  Wireless
    Wireless audio streaming, does not require custom wiring
  Multi-Speaker
    Multiple loud speakers in each room
  Sound tuning
    Room sensing and automatic sound tuning to enhance audio with digital signal processing
Audio Content
  Multi-room Zuma
    Synced playback for whole house audio
  Multi-room (w/Sonos et. al.)
    Synced playback for whole house audio with legacy and new WiFi enabled speakers (especially Sonos)
  Support for popular services for music, radio, podcasts, audio books etc
    Including Spotify, Tidal, IHeartRadio, TuneIn, Deezer, Audible, Saavn, Qobuz
  Device to Zuma streaming
    Supports other media player sources via mobile phone and PC applications via Airplay and Chromecast
Other Audio functions
  Telephony
    Make and receive telephone calls via Zuma
  Intercom
    Call other rooms or groups of rooms where Zuma is installed, including privacy features like 'do not disturb'
Lighting
  Adjustable Colour Temperature
    Adjustment of white light from warm to cool colour temperature.
    The smart bezel may include lighting color sensors to facilitate the feedback control of room lighting color temperature via adjusting the mixture of the warm and cool LED lighting output channels
  3rd Party Smart home compatibility
    Support and low friction integration of existing smart home lights, switches and controllers: e.g. Wink, SmartThings, Control4
  Voice Control
    Integration with existing voice control platforms
      Amazon Alexa first with provisions to add or replace with Google Home. Support for Apple Siri via Airplay 2 (when available from Apple)
  Sensors
    Sense occupancy, motion, room temperature, lighting colour temperature, sound, light levels
      Enables automation and responsiveness+security and energy management functions
  User Experience
    Zuma experience
      Zuma app for setup and control of all Zuma devices and functions
    Setup
      Super-easy setup (e.g HomeKit's use of Q-codes to provision devices)
    Multi-user
      Support custom scenes and behaviours per occupant
    Guest
      Support guest use of Zuma features (e.g. streaming music from a guest's mobile device)
    Data Security & Privacy
      Best of breed data security and privacy protections
  Zuma App
    Viable as a stand-alone controller for Zuma
      Best of breed UI for setup, control and monitoring
    Account Management
      Login/out, Setup, Linking, Grouping, Access privileges, Status
    Audio
      Set audio R/L. EQ volume, etc, Streaming, Automation functions
    Lighting
      On/off, dimming, color and scenes
    Automation
      Timers, and IFTTT-like functionality
    Notifications
      System status and configurable triggers based on activity and sensor outputs
    Remote Control
  Integration
    Enable control of Zuma functions by existing platforms
      Alexa, Google Home, Apple Homekit, Samsung SmartThings, Control4
  Installation
    New Installation
      GU10 Recessed Ceiling Fixture (Europe)
      Recessed Ceiling Fixture (USA)
    Retrofit
      GU10 Recessed Ceiling Fixture (Europe)
      4"& 6" Recessed Ceiling Fixture (USA)
Zuma is a multi-function smart-home device integrated into the same form factor as a standard GU10 recessed light fixture. FIG. 1 illustrates some of the features of the Zuma system.

The Zuma smart ceiling system 100 provides integrated light, sound, security and voice.

Installs like a light 102. Uses existing mains power lighting wiring connected to your existing light switches.

Compact size 104. High excursion driver and efficient power amplification delivers high volume audio in a small package.

Sensors 106. Specialized PIR sensors detect both people presence and map motion but are also used to measure room temperatures away from the ceiling.

HiFi wireless audio 108. Multichannel high bit rate digital audio optimized for reliability and quality of the signal. Utilizes a separate radio channel than WiFi.

Digital signal processing 110. Digital signal processing in each unit combines with sensing microphones to tune audio performance to the room.

Voice and app controlled 112. Alexa voice commands play audio content and control lights. Media streaming function allows control via mobile phone application.

Far-field microphone array 114. Hidden multi-microphone array and Digital Signal Processing automatically track your voice.

Variable colour temperature 116. High efficiency, high CRI LED arrays are finely adjustable to deliver a range of colour temperatures.

The bezel may include lighting color sensors to facilitate the feedback control of room lighting color temperature via adjusting the mixture of the warm and cool LED lighting output channels.

Class D amplification 118. High efficiency amplification with digital crossover delivers bit perfect audio to analog to digital conversion at the loudspeaker.

Configurations

Multiple Zuma units are usually combined together to form a single Zuma system in one room (see FIG. 2).
- All Zuma units (Satellites) are the same in a Zuma system except for one unit that is a called a Master.
- A Master is comprised of a Zuma unit with a Zuma Brain Cartridge installed.
- The Zuma Brain Cartridge adds intelligence the system as well as a Wi-Fi connection to the WAN and cloud services.
- The Wi-Fi connection is also used.to allow multiple Zuma systems to be connected to each other in a multi-room scenario.
- The Master unit transmits wireless audio via Kleernet Wireless Audio to the Satellites
- The Master unit transmits and receives via Kleernet Wireless signals to control lights and other functions and to measure sensors on the Satellites.

Figure 2:
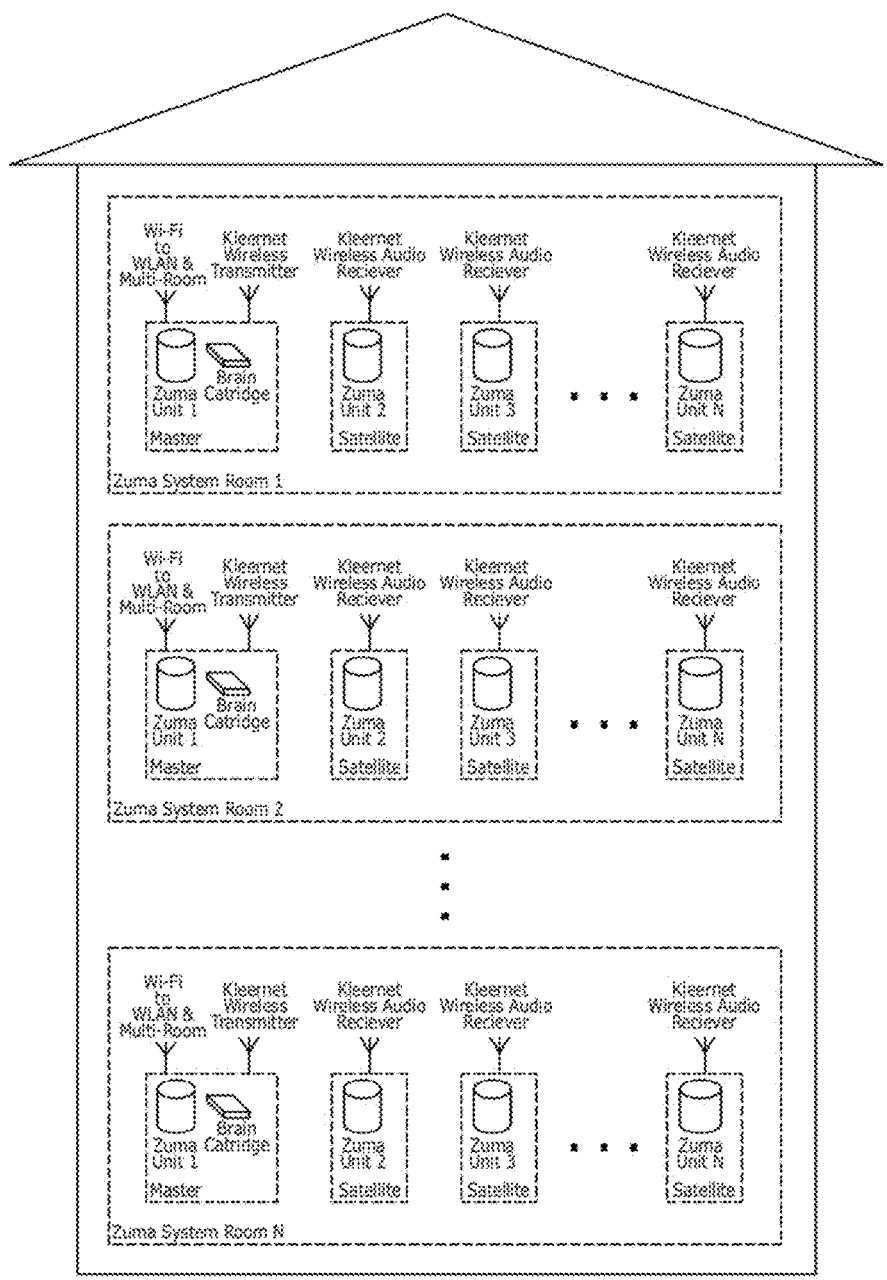
FIG. 2 is a schematic diagram of a smart home system where the devices are spread across multiple rooms.
Figure 3:
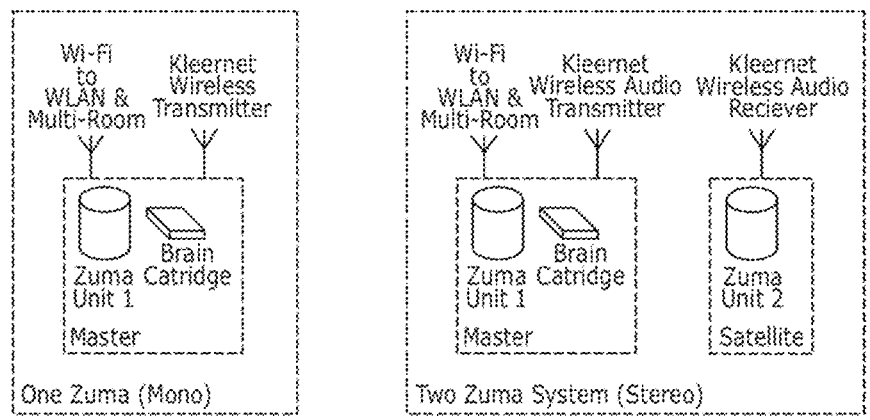
FIGS. 3A and 3B are schematic diagram showing simple examples of a smart home system comprising one or two smart home devices.

FIG. 2 illustrates an example deployment showing multiple Zuma systems (rooms) in a house.
- The Kleernet Audio RF transmission guarantees millisecond level latency of audio signal between all units in the system. This is achieved via multi-cast and buffering. The master unit introduces a delay to maintain synchronization of audio signal with the Satellites.
- There can be up to 12× (Audivo mentioned 18× as maximum?) Zuma units per system
- For rooms that require more units multiple systems can be installed. However, as with the multi-room scenario there will be millisecond level latency between the multiple systems in each room and this will need to be considered and optimized during installation in a single room.
- Wi-Fi topology will determine the maximum number of systems (rooms) in an installation FIG. 3 illustrates examples of simple Zuma systems.

Multiple Rooms «Stream Unlimited/Audivo»
- Simultaneous audio playback across multiple rooms relies on the Zuma Master's connection to other Zuma Masters via Wi-Fl.
  - The latency between rooms is determined by the Wi-Fi performance and is on the order of 5 ms to 20 ms.
  - The Zuma system relies on the Stream Unlimited's implementation of "multi-room".
    - While this feature is part of Alexa functionality, each $3^{rd}$ party Alexa implementation relies on a module proprietary implementation. This effects the "Grouping" feature. Only like systems can be grouped and play together.

Operation

Voice Control <Stream Unlimited/Audio>
  Voice features are provided via $3^{rd}$ party solution. The first candidate is Amazon Alexa. Amazon's $3^{rd}$ party Alexa team claims to be working toward feature parity with Amazon Alexa. However as of this date there is a lag between $3^{rd}$ party Alexa and the main Alexa product:
    Alexa Telephony is not available.
    Alexa Intercom ("Drop-in") is not available.
    Is not integrated with $3^{rd}$ party speaker systems for multi-room or whole home music
    Does not play well with Sonos (mutes all Sonos devices in all rooms when user speaks to any Echo device)

Application Control «Stream Unlimited/Audivo»
  Media Player functionality that is separate from Voice control functionality is part of the Stream Unlimited/Audivo media player system. This system is controlled by either an Apple iOS or Google Android phone application. These applications will be customized and integrated with the Zuma application for each phone platform. Media player features to be supported in Zuma:
  Audio output from Applications on phone or PC
    iOS—Apple Airplay will be used to route audio output from any application on an iOS device. N Notifications and incoming phone calls will interrupt audio playback
    Android—Google Chromecast will be used to route audio output from any application on an Android device. Notifications and incoming phone calls will interrupt audio playback.
    Bluetooth—Both iOS and Android as well as other Bluetooth audio sources can connect to Zuma via Bluetooth. The audio quality is limited to Bluetooth bitrates. Notifications and incoming phone calls will interrupt audio playback
    MacOS—Apple Airplay will be used to route audio output from any application on a MacOS device. Notifications and other application audio will interrupt audio playback. Google Chrome cast should work as well but will not be recommended.
    Windows—Google Chromecast will be used to route audio output from any application on Windows. Notifications and other application audio will interrupt audio playback.

Light Control
  Apple Homekit—On iOS it will be possible to configure light and other IoT control via a Zuma UI that uses Apple Homekit as its platform. Homekit supports SmartThings devices via the SmartThings Home Hub. When used in conjunction with an Apple device that supports Homekit Home Hub, the home control that is configured via Homekit in the app will persist even if the configurating phone is not on premises or turned off.
  Samsung SmartThings—On Android it will be possible light and other IoT control via Zuma UI that uses the Samsung SmartThings platform.
  The Zuma UI for Samsung SmartThings will be functionally equivalent to the Zuma UI for Apple homekit.

Installation Tutorial

The application will include a step by step video tutorial for installation of the unit.

This will be tested to work with 80% of potential DIY user audience.

Setup

The application will walk the user through setup:

Zuma user ID registration or login

Bluetooth LE pairing of system to facilitate easy Wi-fi setup

Wi-fi (enabling Airplay, Chromecast)

Bluetooth pairing for audio

Signup for Alexa and Spotify Connect

Product Configurations

Zuma Light, Sound and Sensor

Zuma Head Unit

This is the primary Zuma unit that is installed into each position onto the ceiling Control & Power Module This is the primary Zuma unit that connects to the mains light circuit and then powers the Zuma Head Unit. The basic power module contains LED drivers, Audio amplifier, Kleernet Audio RF receivers and Digital Signal Processing (DSP)

Zuma Voice Cartridge (1 per room)

The Voice Cartridge is the brain for the Zuma system that plugs into the Control & Power module converting the Zuma Head Unit into a Master control unit for the room. The voice cartridge enables both voice and media streaming services for Zuma and is required for the system to function.

Mounting Kit

The mounting kit creates a quick install fixture to hold the Zuma head unit and the Control & Power module. The mounting kit fits through a rough opening cut in the ceiling and clampls in place using ratcheting fasteners. Once installed the Control & Power module are connected to mains light circuit and then is pushed up through the hole and snaps into place on a bracket that is part of the mounting kit. The sound and data cables are pulled through the hole. These are attached to the Zuma head unit. Then the Zuma head unit is inserted into the hole and the bayonet mount is rotated into a locked position.

New Installation Mounting Kit

For a new install the Mounting Kit is modified with adjustable brackets that hold the Zuma Head Unit and the Control and Power module in place between joists before ceiling plaster board is put in place.

Zuma Light and Sensors

Head Unit

Control & Power Module

Apple Homekit Adapter Cartridge

Optional Sensor Extension Cartridges

Camera Sensor Module

Life Safety Sensor Module

Home Hub Module

Wifi Extender Module

Mechanical Design

Figure 4:
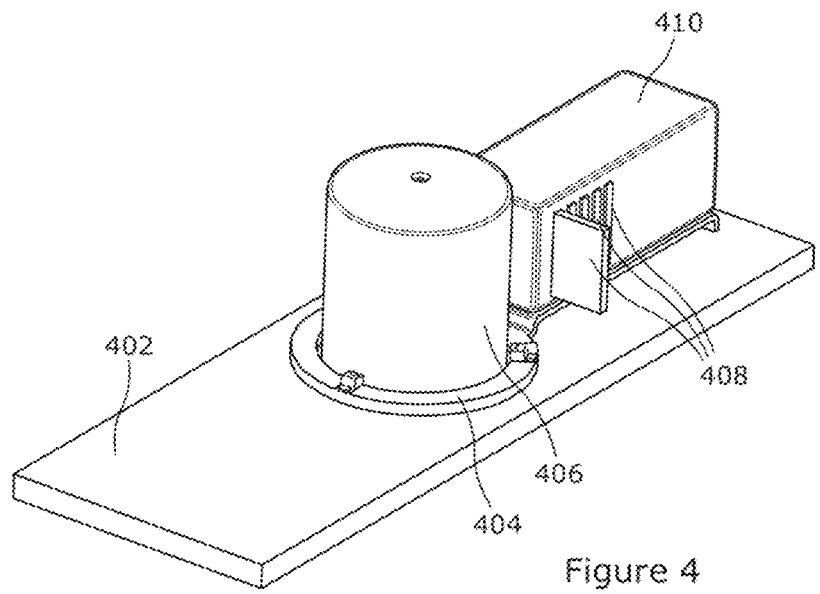
FIG. 4 shows a rear isometric view of a smart home device mounted in a ceiling.

FIG. 4 illustrates an example Zuma device mounted in a ceiling (rear view). The Zuma head unit 406 is mounted in the ceiling plaster 402 with a mounting kit (bayonet) 404. A control and power module 410 includes slots 408 for Cartridges/Modules. These may include: 1) Voice 2) Far-field 3) DSP 4) Sensor 5) LED/Amp 6) Pwr/Bat.

Figure 5:
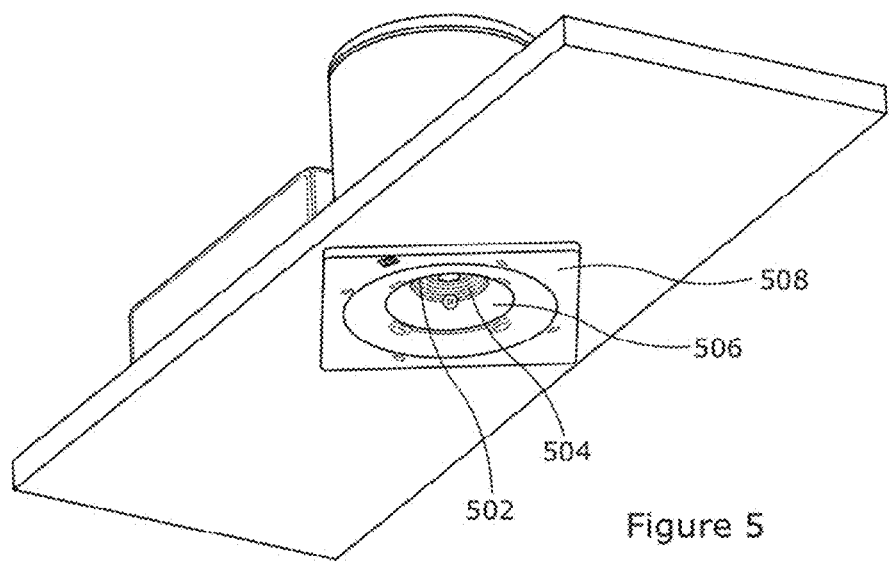
FIG. 5 shows a front isometric view of a smart home device mounted in a ceiling.

FIG. 5 illustrates an example Zuma device mounted in a ceiling (front view). High frequency sound is emitted from the tweeter 502 positioned radially inward of the light 504. Low frequency sound from the loudspeaker exits the device 506. The device includes a square bezel with sensors 508.

Figure 6:
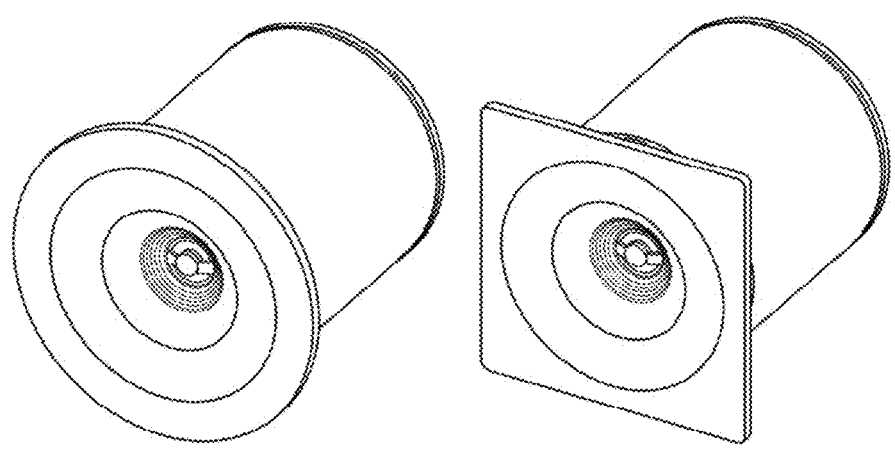
FIGS. 6A and 6B show front isometric views of smart home devices having round and square bezels.

FIG. 6 illustrates two example bezels for Zuma devices— round and square bezels.

Figure 7:
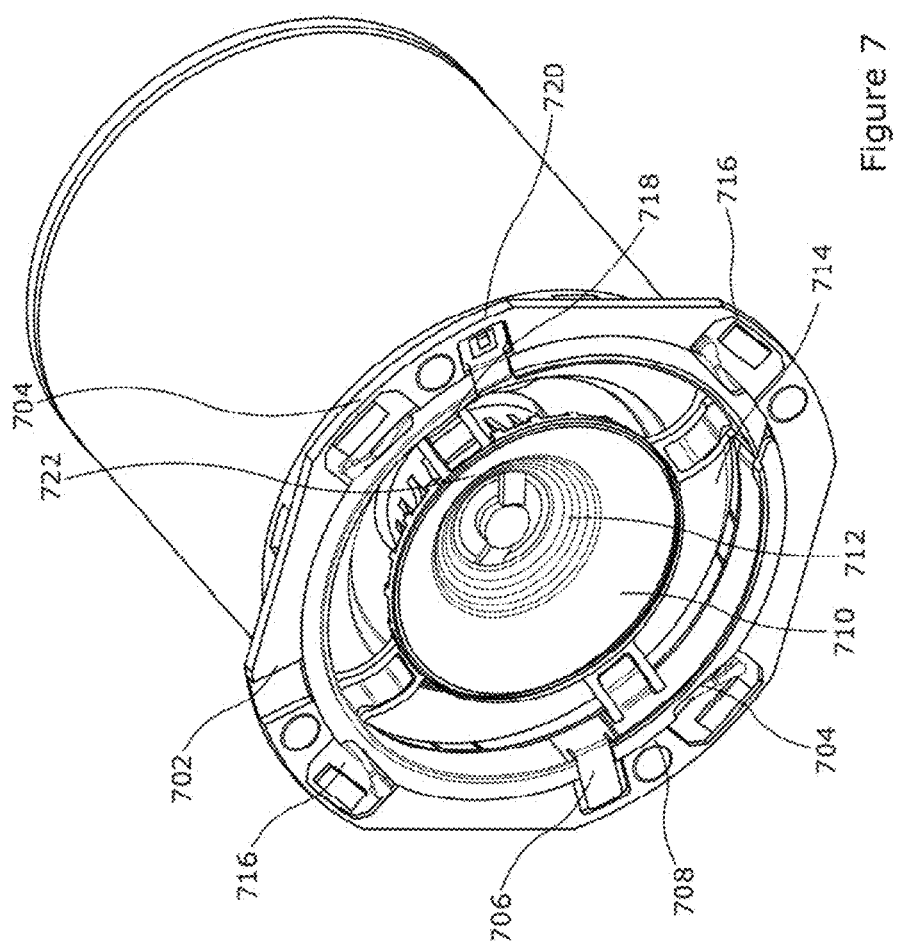
FIG. 7 shows a front isometric view of a smart home deice with the bezel removed.

FIG. 7 illustrates a Zuma device without the bezel. The device includes a Sensor-Bezel Connector Pad 702, 2× Kleernet Antennas 704, DSP Microphone 706, 4× Magnets (bezel mounts) 708, Tweeter Horn 710, LEDs 712, Mid-range Driver 714, 2× Wi-Fi Antennas 716, 4× Far-field Microphones 718, 4-channel Non-dispersive Infrared (NDIR) sensor 720 and Tweeter 722.

Figure 8:
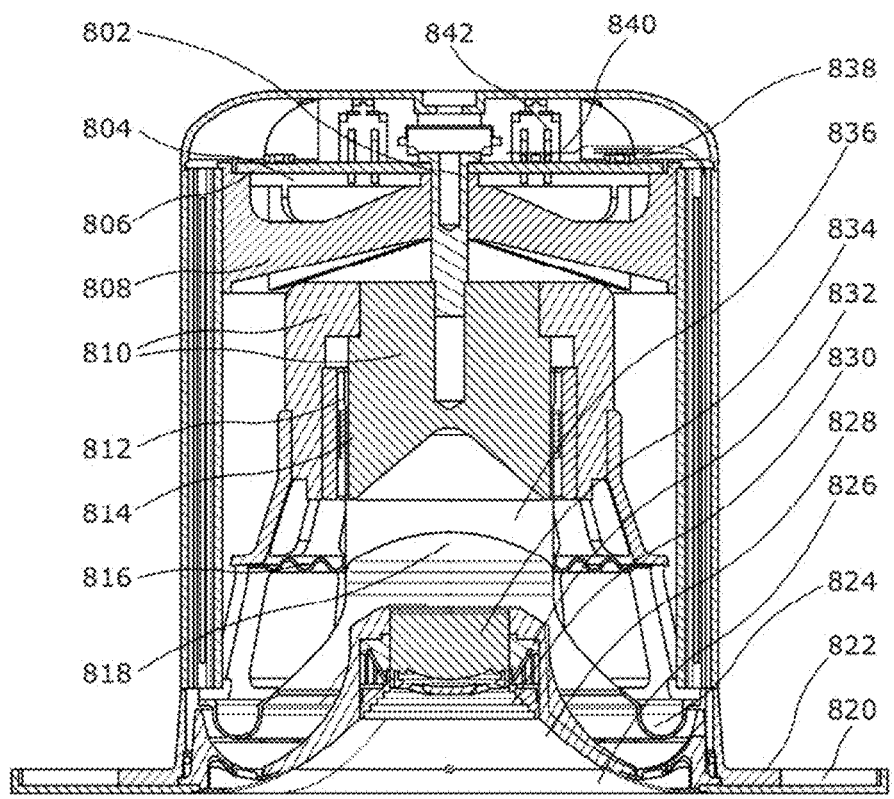
FIG. 8 shows a sectional view of a smart home device.

FIG. 8 shows a cross-sectional view of a Zuma device. The device includes Signal Connector 802, High Speed Sense Flex 804, PCB 806, Seal Carrier 808, LF Tube 810, LF Magnets 812, LF Coil 814, Suspension 816, Dust Cap 818, Front Bezel 820, Front Frame 822, Roll Surround 824, Front Grille 826, Carrier Tweeter/LED 828, LED Lens 830, LEDs 832, Tweeter 834, LF Cone 836, Mic/Sense Flex 838, Tweeter/LED Flex 840 and HF & LF Connectors 842.

Features

High Fidelity Audio:

Full Range high fidelity drivers

Mid and high frequency drivers with digital crossover. 75 Watt per channel D-Class amplifier.

High Fidelity Digital Audio

All digital audio path: lossless, high bit rate, with digital to analogue conversion occurring in last stage via digital (D-Class) high performance power amplifier.

Wireless

Wireless audio streaming, does not require custom wiring. The use of wireless audio between Zuma units in the same room means that no custom wiring between the units is necessary. The Zuma units can simply be connected to the mains power that is available at each light fixture (either installed during wiring for new build or pre-existing in the case of retrofit).

Sound tuning

Room sensing and automatic sound tuning to enhance audio with digital signal processing from Audivo Multi-Room (Zuma)

Synced playback for whole home audio using WiFi Alliance TimeSync protocol or proprietary solution Multi-Room (Sonos et. al.)

Using Airplay (testing required) or new capabilities from Amazon/Google or direct integration with Sonos and other 3rd party speakers Audio Content:

Support for popular services for music, radio, podcasts, audio books etc

Supported by SUE/Audivo or Amazon/Google/Apple integration. Service accounts linked to the system through the Zuma app or grandfathered in from an existing smart home app (Spotify, Tidal, Deezer etc. . . . )

Sonos Integration

Alexa Sonos Integration via Sonos 1

Sonos Integration/Alexa Setup

Without Alexa Sonos 1—Use Zuma TV/HiFi Transmitter to feed analog audio into Sonos system Auxiliary input. This is then broadcast to Sonos as specified by Sonos App.

Bluetooth from iOS or Android Zuma app communicates with master and does "soft" button presses for Alexa app pairing . . . (this needs to be thought through so it does not suck with frictions)

Other Audio functions:
Telephony
Initiate, terminate and manage calls with voice commands via Zuma speakers. Not currently supported for 3rd party Amazon or Google devices. Implement with Twillio.
Intercom
Call other Zuma units and manage intercom related privacy features with voice commands via Zuma speakers. Not currently supported for 3rd party Amazon or Google devices. Implement with Twillio.

Voice:
Zuma Alexa Skill Setup
User sets up Zuma skill using Alexa App on iOS and Android
Zuma Alexa Skill Setup/Alexa
Zuma system automatically configures Alexa so that Zuma skill is turned on (is this possible? ask Amazon)
Alexa features that are setup in app or by voice are accessible via iOS and Android phone apps and by voice commands.
Without Alexa
iOS App—Setup Scenes (within rooms) & Groups (groups of rooms)

Light:
Standard functions
On/off, dimming, timers, colour setting, grouping, scene setting, adaptive to presence, time of day etc. using voice commands and skills via Alexa/Google/Apple integration
Voice commands via Zuma
Adjustable Colour Temperature
Set scenes (Although Hue and Alexa do not support this) that may have different colour settings for individual lights within a scene
Adaptive lighting
Changes of scenes based on sensor data collected in a room ('reading' lighting if person alone in their reading chair')
Directionally adjustable lighting
Ability to focus or aim lights as part of a scene and/or adaptively
3rd party lights
Group and create scenes with 3rd party lights via Alexa/Google/Apple integration
Zuma Switch (see also block diagrams of switch options)
Works with existent light switches. Unit detects when power is off. When power switched off or power fails, unit detects condition and switches to battery backup. Voice UI communicates condition and then turns off light and sound gracefully. Motion detection will turn on safety lighting and prompt user via voice to turn on light switch. If existing switch has dimmer, it must be replaced with a on off switch. Works with multi-switch circuits.
Works with 3rd party smart switch remote via home hub.
Zuma smart switch module installs in existing light switch box and transforms existing switch into a smart switch that is compatible with home hub.

Integration with existing voice control platforms and home control hubs:
All supported Zuma functionality
Propagate scene and grouping metadata and state to and from Zuma setup to Alexa, Google Home, HomeKit, Control 4, SmartThings. Create voice-activated 'Skills' for all Zuma functions on all voice control platforms Multi-User/Guest Features:
Spotify Connect/Airplay
If user is not in room and someone else is then don't let Spotify control device in that room without permission. May not be possible talk to Spotify
If on the same network, then Airplay lets anyone take over. (verify)
Chromecast
If on the same network, then Android lets anyone take over. (verify)
Alexa Spotify Connect Account Switching
Spotify Connect on Phone
Alexa Spotify Connect Account Switching/Out of the box (kit)
Spotify connect on Alexa
All Zuma units put into same box kit in factory are pre-paired, so no pairing required. Otherwise pairing can be done from app.

Zuma Setup:
Zuma Switch
Zuma switch in same box kit is pre-paired, otherwise it can be paired in app.
Dumb Switch
Only works if the battery power supply is in place. No pairing required.
Additional Zuma Units
Push button via small hole in cover and light flashes indicating ready to pair. Use app to push button on Master. (Verify sequence with Audivo to specify this feature)
Connecting master to the network for the first time
Bluetooth Low Energy (BILE) beacon in Master unit talks to setup in app and drives Wi-Fi connection without having to switch Wi-Fi networks
Connecting master to the network for the first time/ Security App
Standard Wi-Fi switching setup UI.
Use PIR sensors and 3rd party home hub security to offer integrated solution Additional Zuma Services:
Wi-Fi Mesh Networking
Add Wifi Mesh networking as cartridge
Video monitoring
For multiple applications (below) either as a separate SKU, integrated 3rd party device or as part of the Zuma sensor array contained in the Zuma recessed speaker/lighting fixture
Security App
Home security (requires broad Zuma deployment in the home and may require additional sensors and/or SKUs)
Energy Management App
PIR sensor used to measure floor. Integrate this information with temperature sensor data and other data to control thermostat(s)
Elder care App
Monitor and report activities of elder or disabled inhabitants to infer health and wellbeing as well as the activities of caregivers Data Sharing App
   Collection of PII related to activities in home. Permissions bases sharing of this PII with 3rd partied to drive a consumer approved "non-creepy" personalized experience.
AI/Big data Apps
Backend/DevOps:
   Over the Air Update (OTA)/Data Security
      Zuma App updates—via SUE OTA to Zuma client app that installs Zuma app.
      Firmware updates—via SUE OTA to Zuma client app that installs Zuma app
      Encrypted transport via Amazon IOT abstraction layer. (discussed with Nic)
   Data Security/Data Privacy/GDPR
      Secure logging for development and user event streams
      Secure multi-party access data base
   Data Privacy/GDPR/Unit Testing Infrastructure
      GDPR logic
      Log based GDPR audit trail
      Multi-language/platform strategy
   Unit Testing Infrastructure/Logging Infrastructure
      Logging for verification
      Multi-platform logging to cloud
   Logging Infrastructure
      Encrypted data for data security
Failure States
Loss of Internet Connectivity:
   System
      If heartbeat is not detected, a system notification is sent to the Zuma admin.
   Remote Control
      Remotely invoked functions that fail are flushed from the queue (to avoid unintended consequences at an uncertain future time) after N seconds and a notification of the failure is sent to the invoking party.
   Voice control
   Zuma App functions
   Streaming from mobile devices
      Via WiFi and/or Bluetooth
   Automated functions
      Those that depend on information that comes from the cloud will be disabled. Those that rely only on local sensors and state variables will continue to function. When connectivity is restored, all disabled automated functions will run and update the system and devices as appropriate
   Phone calls
   Local Intercom
   Cloud-based streaming services
   3$^{rd}$ party integrations
      Will work as long as they themselves are not dependent on internet connectivity
   Notifications
      Notifications are generated in the cloud. Once network connectivity is restored local events will be uploaded and notifications that would have been triggered will be sent.
   History/Logging
      Complete logs will be stored in the cloud so will not be accessible, however, local events will be stored until connectivity is restored and then uploaded and added to the system log
   Workarounds
      Use Zuma App instead of voice commands and stream audio from mobile devices Loss of WiFi Connectivity:
   System
      Only functions that are supported by Master units and do not rely on any network connection will function. A system notification is sent to the Zuma admin
   Remote Control
   Voice control
   Zuma App functions
   Streaming from mobile devices
      Via Bluetooth to Master and its group
   Automated functions
      Those that depend on information that comes from the cloud will be disabled. Those that rely only on a master's local sensors and state variables will continue to function. When connectivity is restored, all disabled automated functions will run and update the system and devices as appropriate
   Phone calls
   Local Intercom
   Cloud-based streaming services
   3rd party integrations
      Will work as long as they themselves are not dependent on internet connectivity
   Notifications
      Notifications are generated in the cloud. Once network connectivity is restored local events will be uploaded and notifications that would have been triggered will be sent.
   History/Logging
      Complete logs will be stored in the cloud so will not be accessible, however, local events will be stored until connectivity is restored and then uploaded and added to the system log
   Workarounds
      Use light switched to control lights and stream audio from mobile devices via Bluetooth
Loss of Master/Slave connection or Slave power:
   System
      A system notification is sent to the Zuma admin
   Remote Control
   Voice control
   Zuma App functions
   Streaming from mobile devices
      Via Bluetooth to Master and its group
   Automated functions
      Functions that depend on sensor data from the specific disconnected device will not function while disconnected or unpowered
   Phone calls
   Local Intercom
   Cloud-based streaming services
   3rd party integrations
      Will work as long as they themselves are not dependent on internet connectivity
   Notifications
      Notifications that depend on sensor data from the specific disconnected device will not function while it is disconnected. If it had power, once connectivity is restored events will be uploaded and notifications that would have been triggered will be sent.
   History/Logging
      Logs will be incomplete until connectivity is restored and events can be uploaded and added to the system log if the device was powered and its sensors were functioning
   Workarounds
      If sensors in the disconnected device are being used for automation and/or notifications AND there are equivalent sensors in other connected devices within the same group they could be used as stand-ins while the device is disconnected or without power Mobile Application Features and Functions Account Management:
   Login/out & password management
   Support sign-in with Google/Facebook?
   Optional Setup wizard guides user through initial setup procedures
   Add Zuma devices via Wi-Fi connection to Zuma master unit(s) then provision 'slave' units to the master's group using audio/light feedback (Add blinking light to the group?'). For switches, prompt an actuation to ID the particular device. In all cases provide acknowledgement of both success and failure with in-App and IRL feedback.
   Once provisioned remove, reset or re-group using the same mechanism
   Assign groups to rooms (do groups=rooms?)
   Assign rooms to zones (default 'House' group contains all devices)
   Connect Zuma to a hive device
   Link other services/devices to Zuma (Alexa, Google Home, Spotify, Wink, Smart TV etc) avoiding, whenever/however possible, the need to log into the other service and remembering passwords
   Assign linked 3rd party devices to Zuma groups/rooms
   Link contacts from phone or cloud service (Google, MS . . . ) to your Zuma account for phone calls and notifications.
   Enable and invoke Zuma voice commands via the mobile device that the Zuma App is running on
   View dashboard (see Apple Home App) that shows the state (on/off, enabled/disabled, connected) of all devices, groups, zones and scenes AND enables drilldown to detailed info (e.g. light colour or song/streaming service being played) and fine control of specific devices
   Access to Help and Contact Support (text, email, chat?)
   Create notifications via text or email based on sensor outputs and other state variables
   Purchase Zuma products, find, where to buy, channel partners to buy through and 'certified' installers
   Access configurable activity history potentially including login/outs, changes to device/system settings, sensor data, automated actions, function invocations, notifications etc.
   View dashboard (see Apple Home App) that shows the state of all devices and enables drilldown to info and control of specific devices
   Enable remote control of Zuma from outside of the home (via a cellular network)
   Enable/disable specific remote functions to limit the types of functions that can be invoked from outside the home
   Add/invite authorized users to access and use the Zuma system
   Define user roles (including guests and other 3rd parties) for limited set of functions over certain periods of time (e.g. for guests or service providers)

Audio:
   Set and control audio R/L, EQ, volume etc
   View current media outputs per device/group/zone (see dashboard (above)
   Set default music/audio service
   Enable and configure intercom functionality and privacy settings for groups/devices
   Enable streaming of audio from the mobile device running the App [This may not be relevant to the Zuma App since streaming will be dependent on the type of device and/or the streaming app (e.g. Bluetooth discovery and connection is done by the mobile device and Airplay/Chromecast capabilities are app-dependent]
   Play playlists from the service in which they reside [This too is, as above, app-dependent for streaming from the mobile device. Otherwise this would be invoked via voice commands to Zuma, not via the Zuma App]
   Skip/repeat songs—loop/randomize/sequence playlists [Invoking these functions from within the Zuma App, while very desirable, will depend on access to the integrated services' APIs if they exist]
   Set on/off times for streaming audio
   Set privacy mode (mics off) by group/zone
   On/Off/volume Individual/group/zone via the dashboard Lighting:
   Turn on/off lights/groups/zones (via dashboard)
   Dim lights/groups/zones (via dashboard drill down)
   Set color for lights/groups/zones (via dashboard drill down)
   Set default brightness and color for lights/groups/zones (via dashboard drill down)
   Create Timed actions for on/off and scenes
   Create sensor-based default behaviors for lights/groups/zones (e.g 'turn bathroom light on if motion detected after sunset then turn off after no motion for 20 seconds)
   Access all functions that are available in any linked, non-Zuma devices and services Smart Home:
   Create scenes with light and audio for groups/zones which can be invoked, enabled/disabled and edited via the dashboard
   Create automated functions for light and audio that respond to sensor outputs and state, time, ambient conditions (day/night, weather . . . ) and, if possible, identity (based on presence of user's mobile device)
   Provide common, pre-configured scenes and automation function for easier setup AND feature demos
   Access all functions that are available in any linked, non-Zuma devices and services
   IFTTT-type automation Hardware Block Diagrams FIG. 9 illustrates a modular hardware block diagram of the Zuma system.

Figure 9:
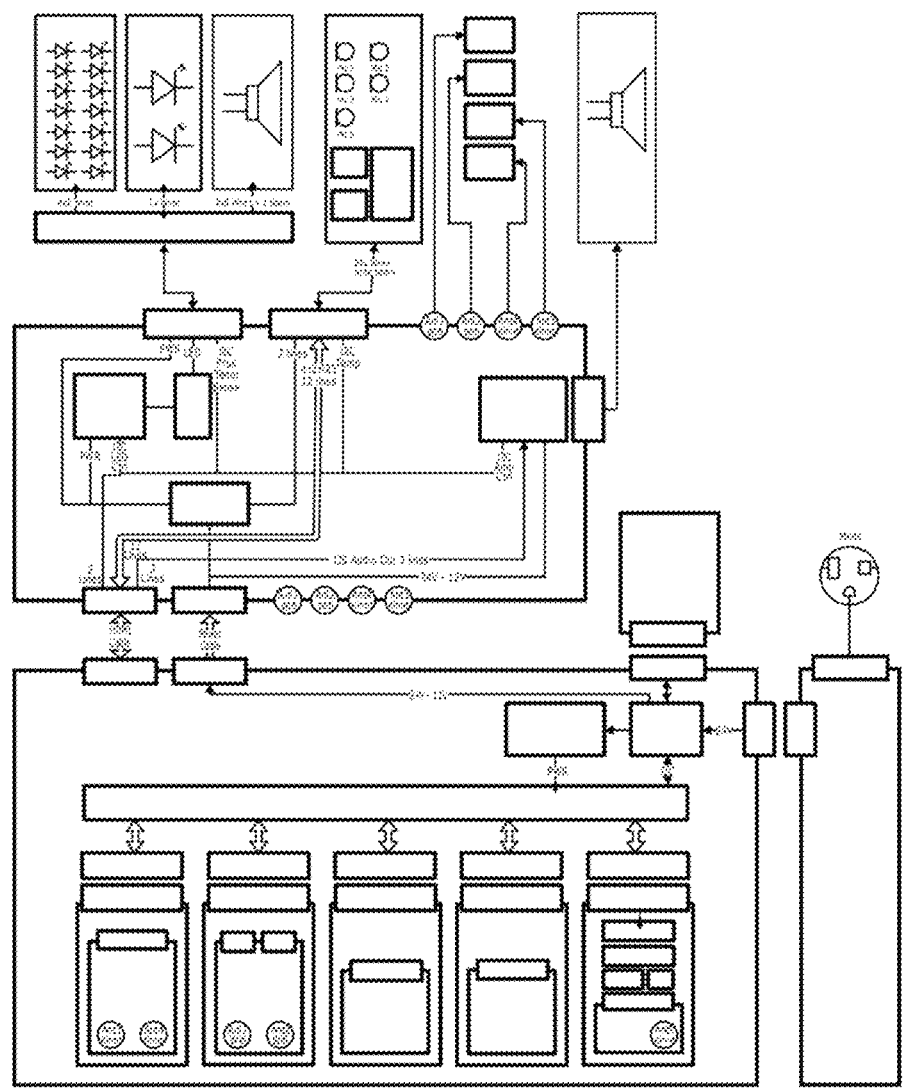
FIG. 9 shows a hardware block diagram of a smart home device.
Figure 9A:
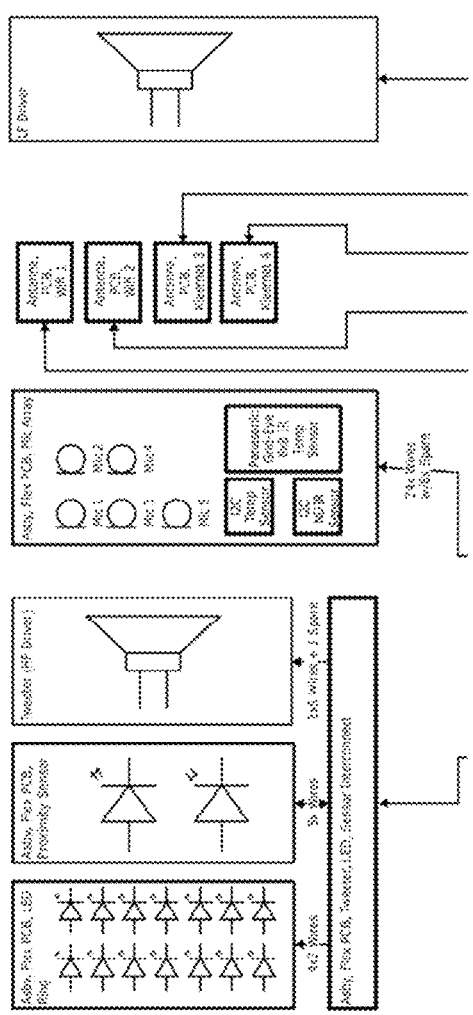
Figure 9B:
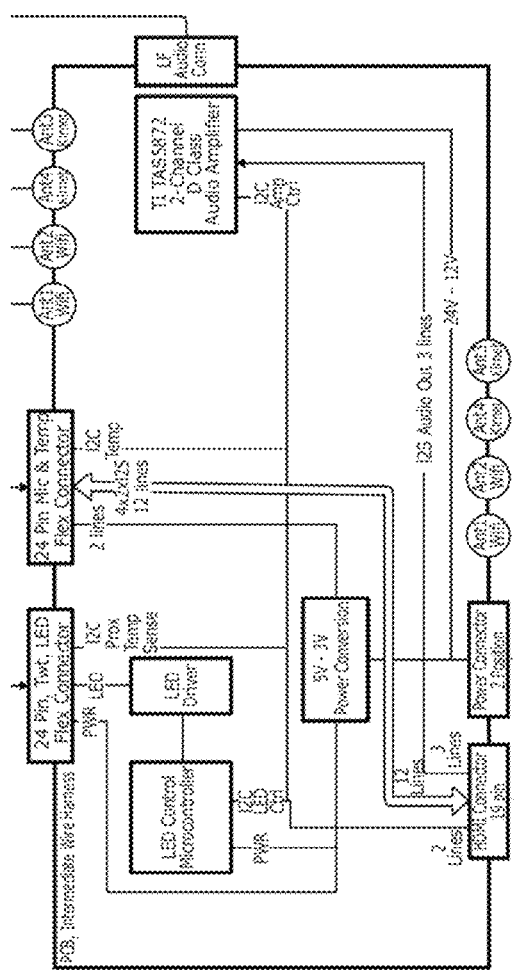
Figure 9C:
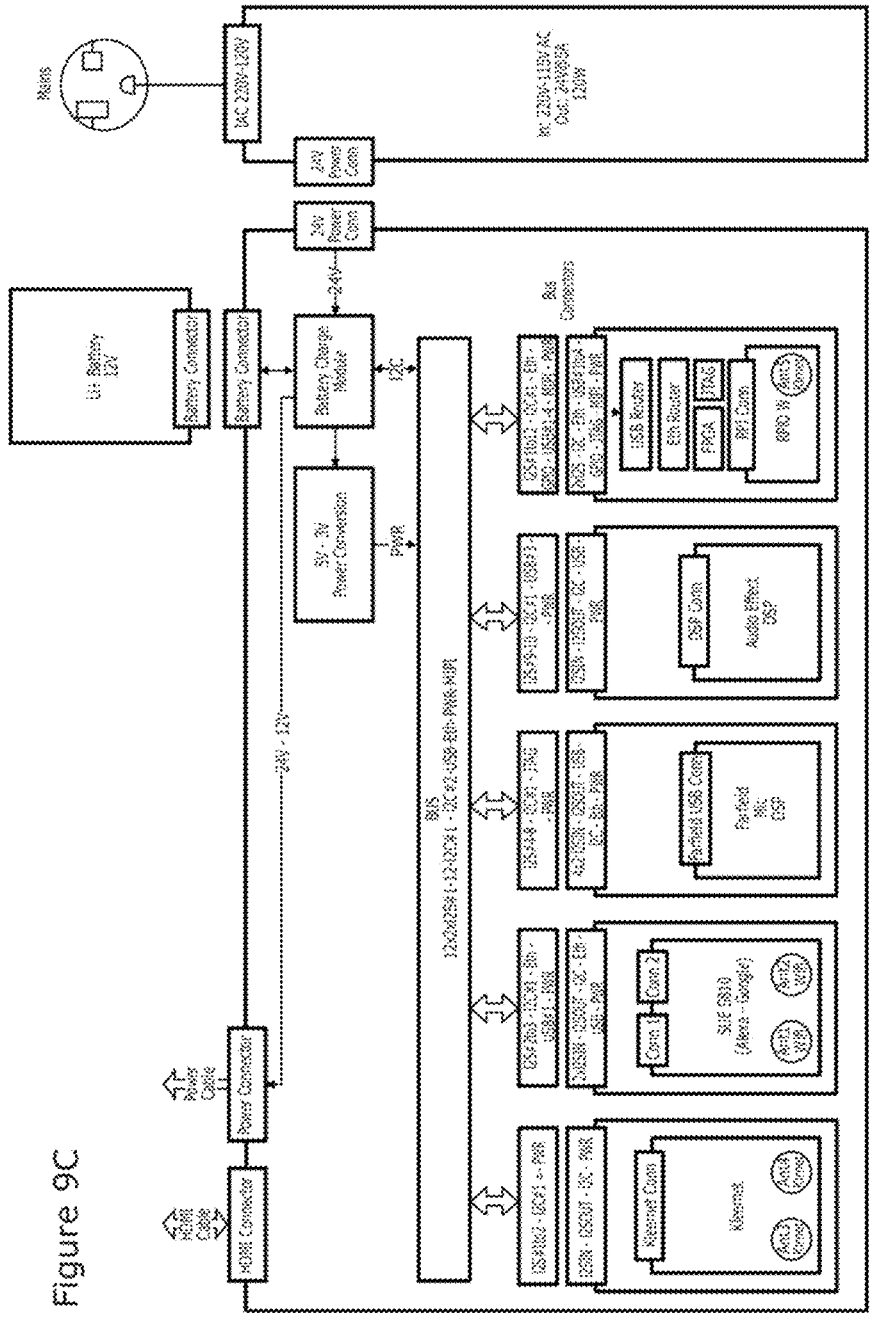

FIGS. 9A 9B and 9C show parts of FIG. 9 in greater detail.

Software Block Diagrams

Figure 10:
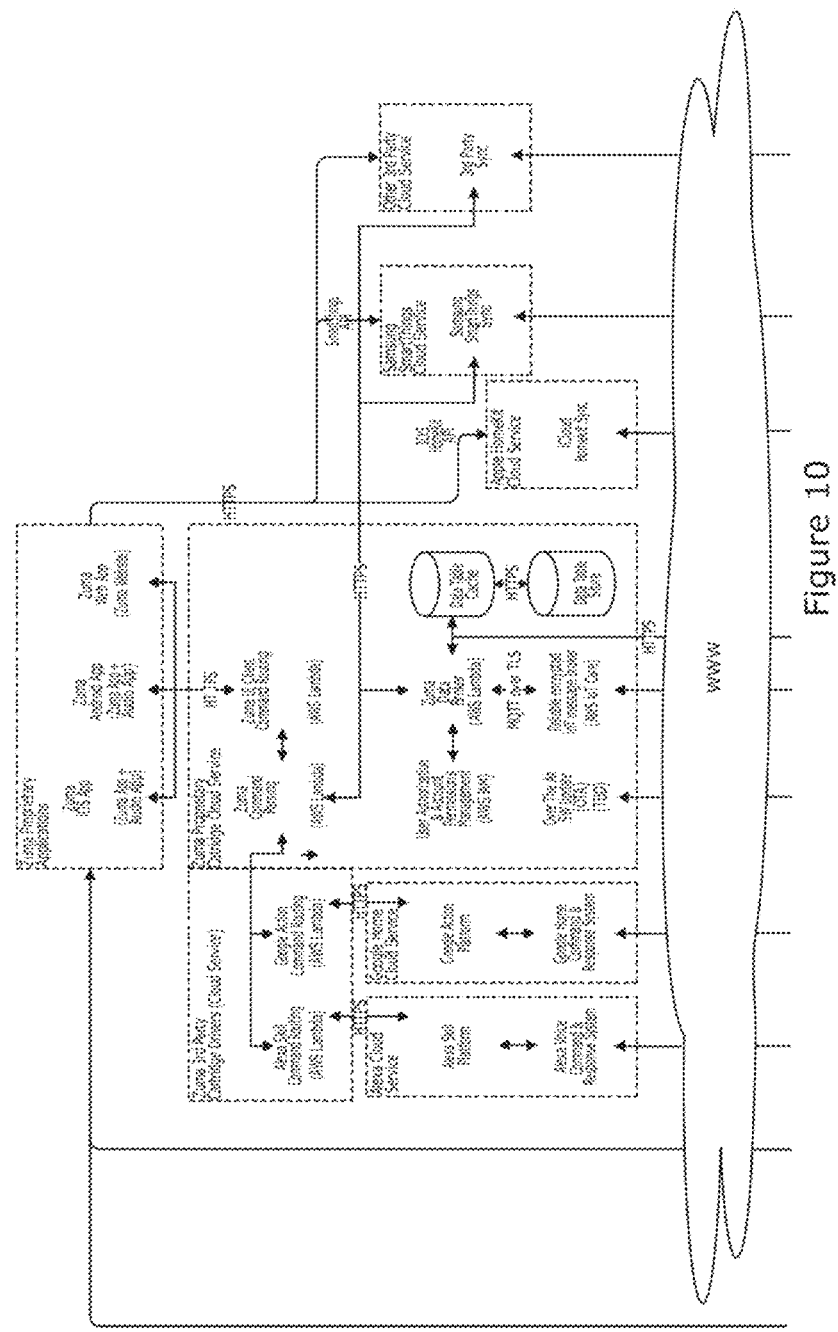
FIG. 10 shows a software schematic diagram of a smart home system and cloud services platforms.
Figure 10:
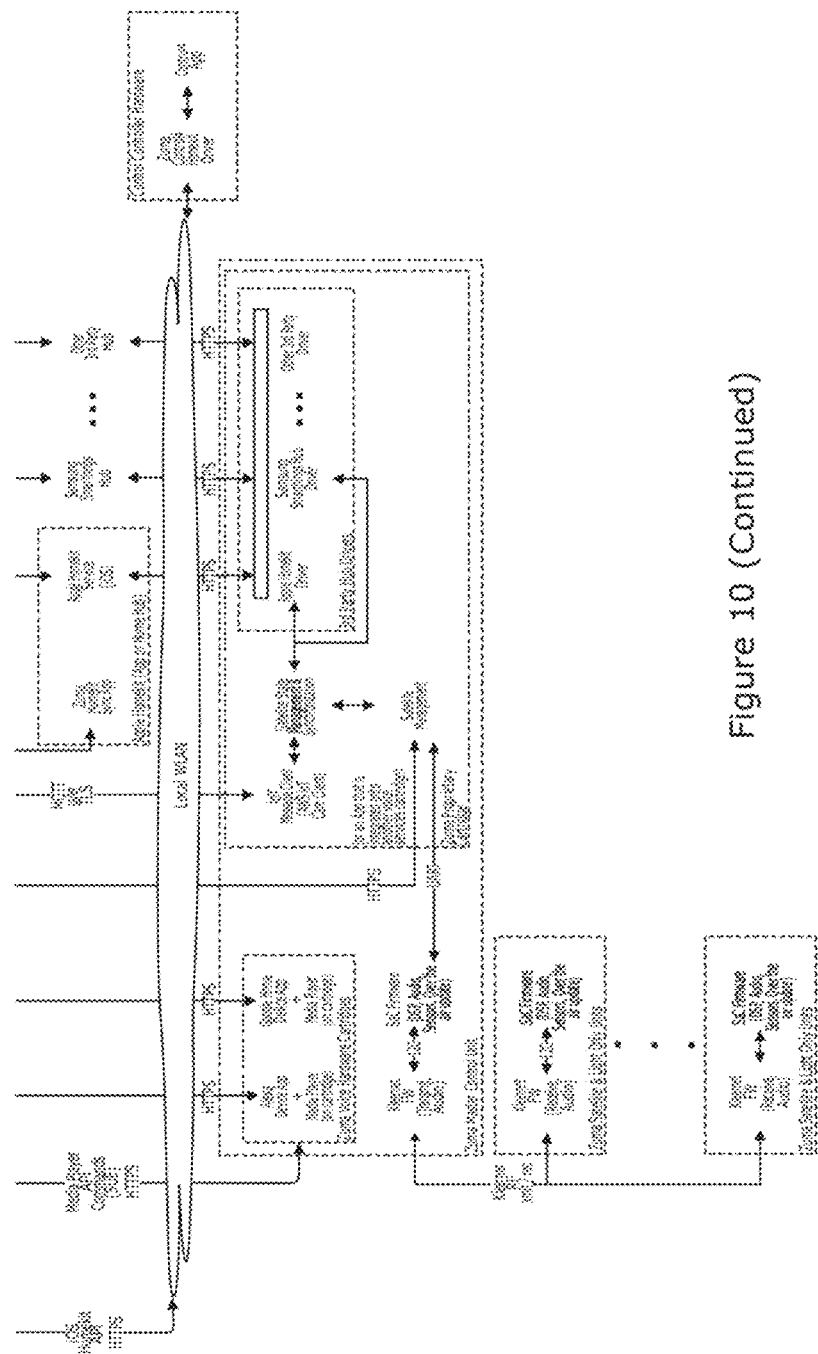

FIG. 10 is a software block diagram illustrating a cloud and hardware overview of the Zuma system. FIGS. 10A 10B 10C and 10D show parts of FIG. 10 in greater detail.

Figure 11:
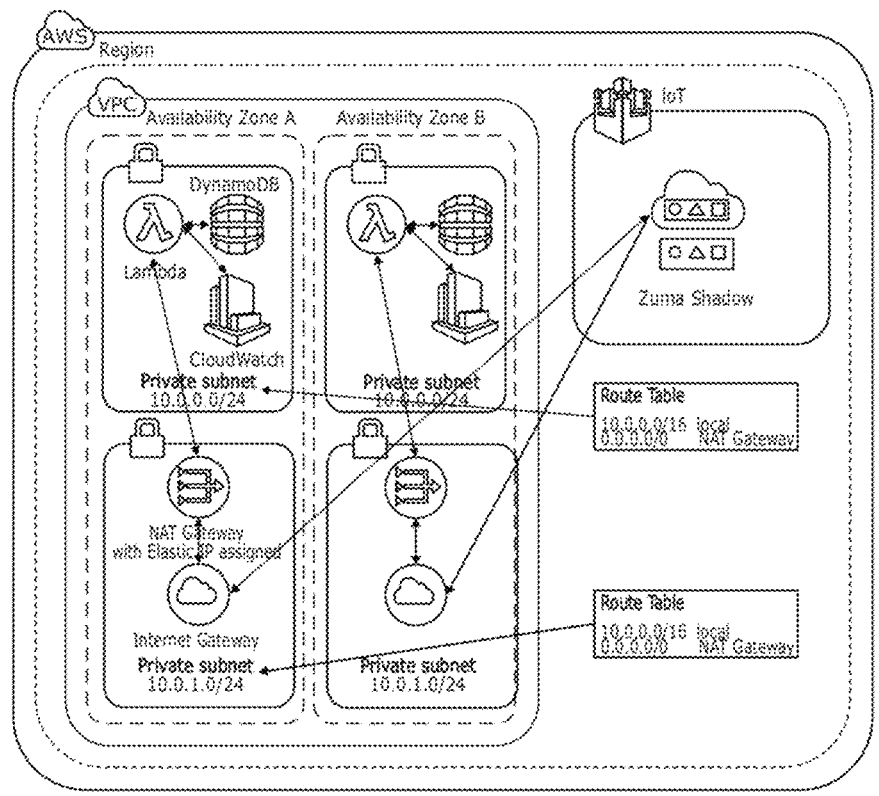
FIG. 11 shows a network configuration diagram of a cloud services platform.

FIG. 11 illustrates the Zuma cloud service (AWS) configuration

Zuma Switch Block Diagrams (See also description of options under "Lighting" in Features section above)

Figure 12:
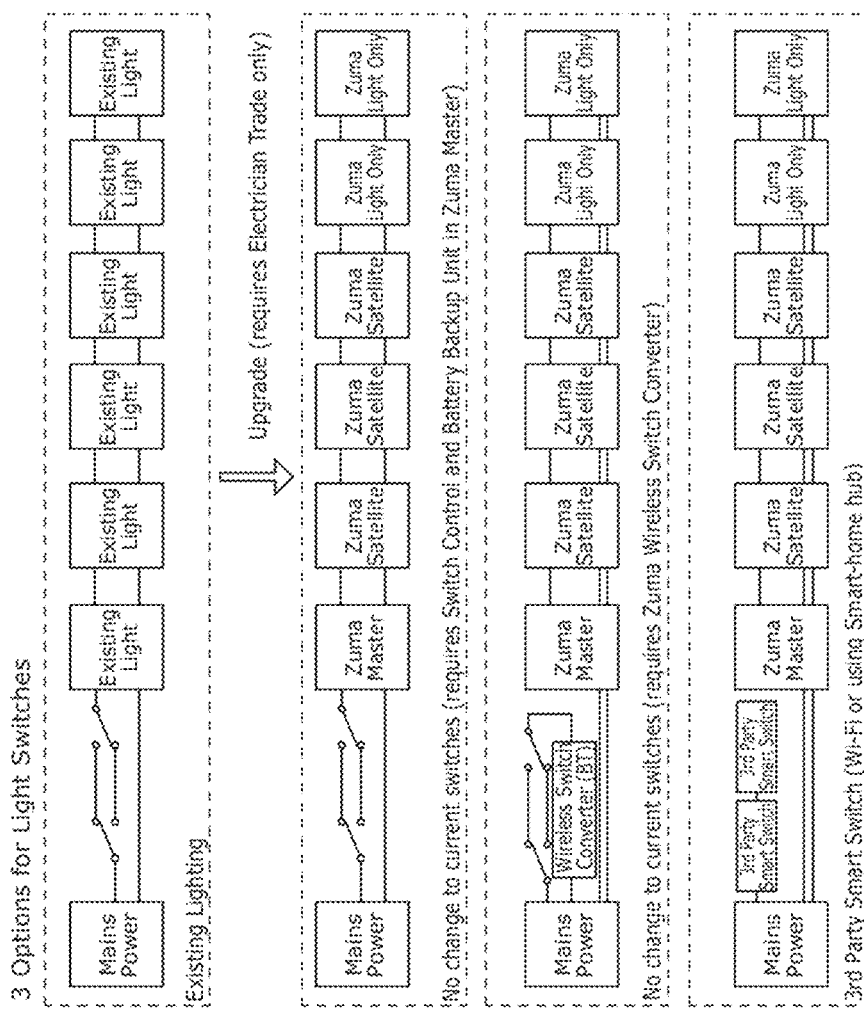
FIG. 12 shows how light switches and smart switches may be integrated in a smart home system.

FIG. 12 illustrates some example light switch options for the Zuma system.

Figure 13A:
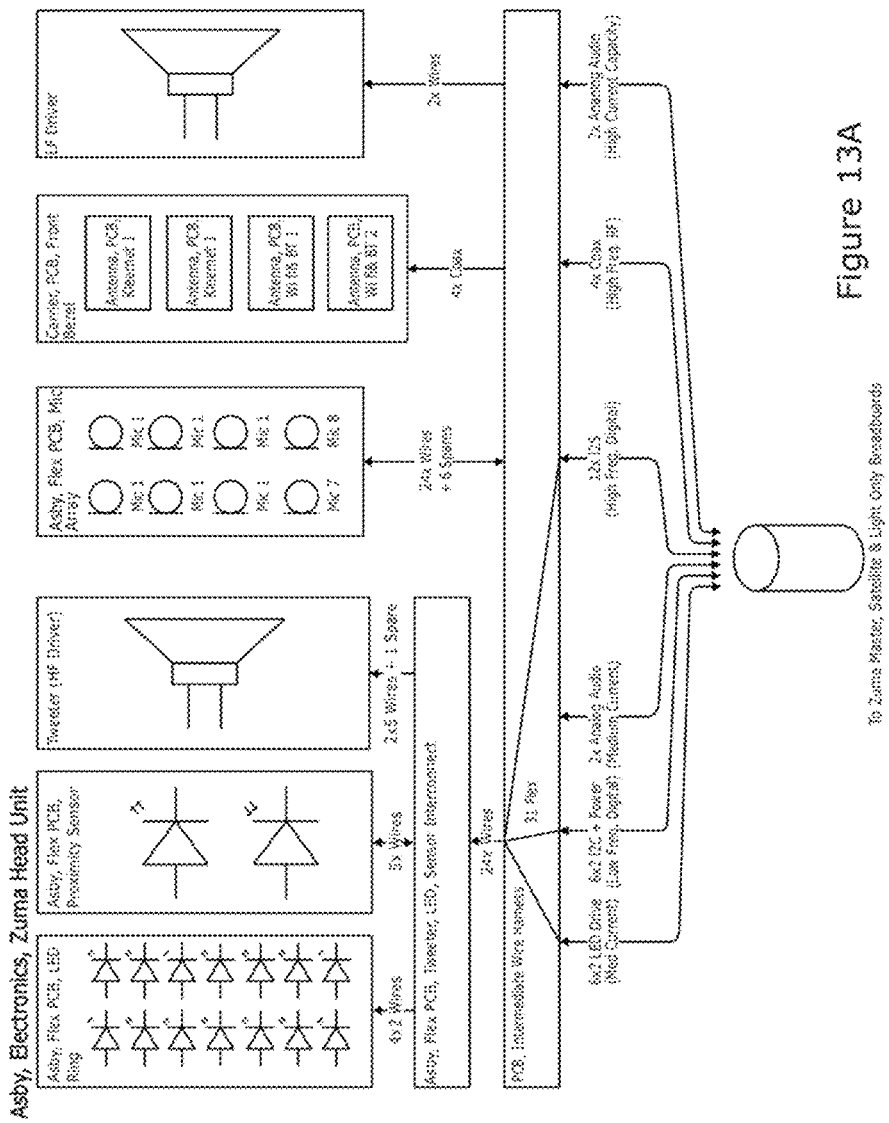
FIG. 13A shows a schematic system diagram of a smart home device.
Figure 13B:
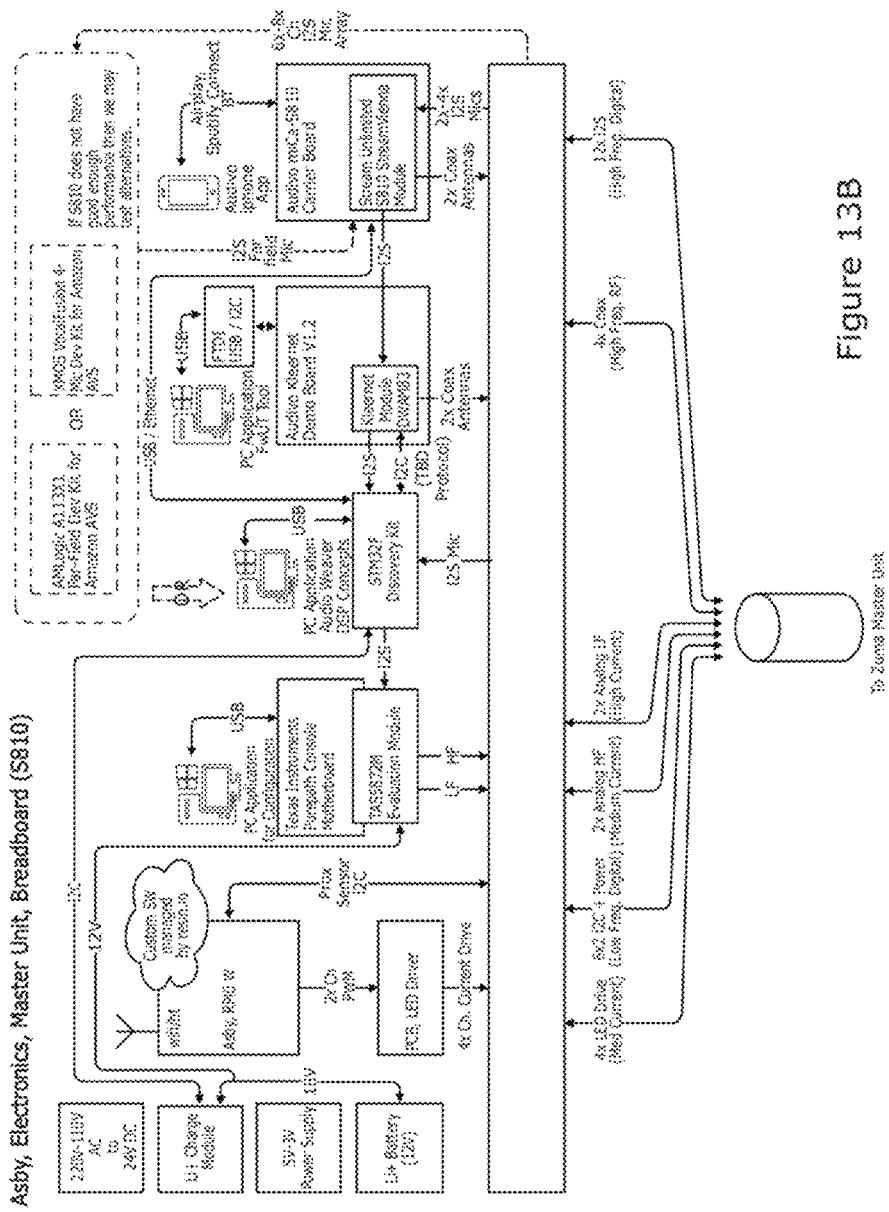
FIG. 13B shows a schematic system diagram of another smart home device.
Figure 14A:
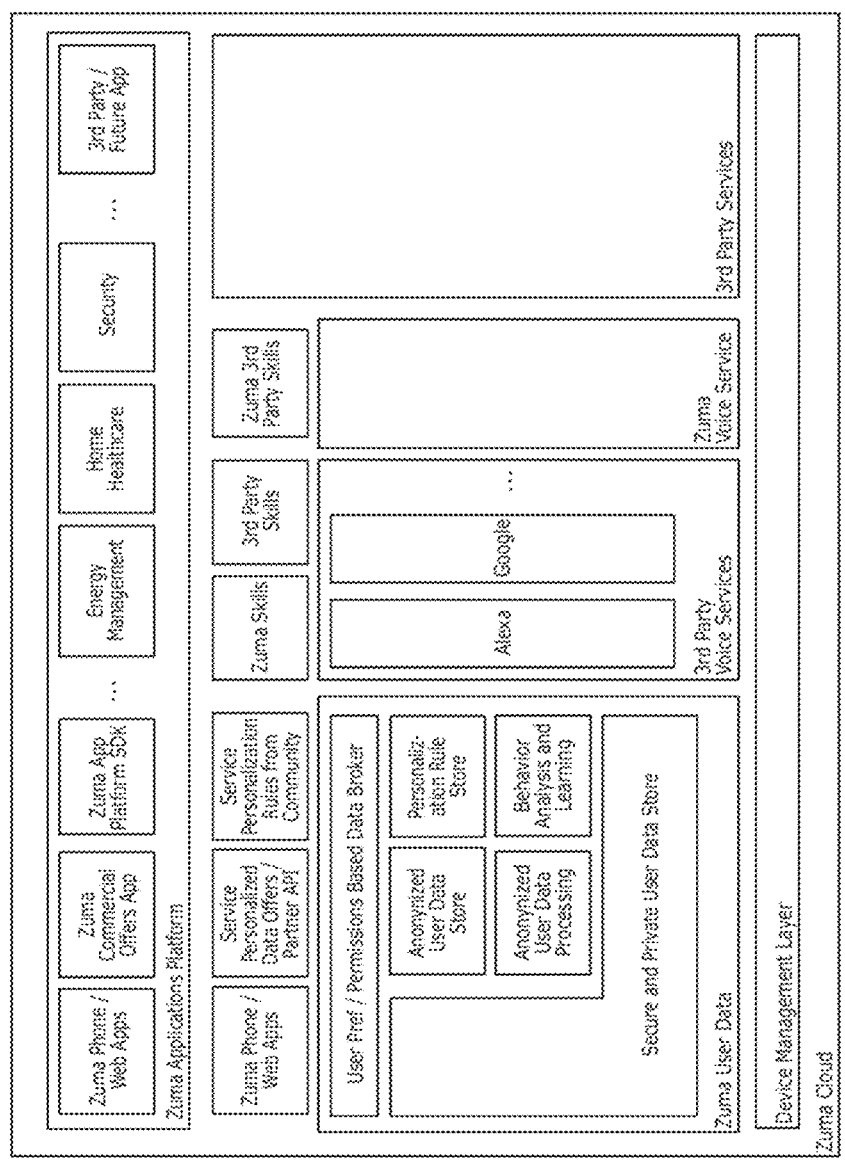
FIG. 14A shows a software architecture block diagram of a cloud service for a smart home system.
Figure 14B:
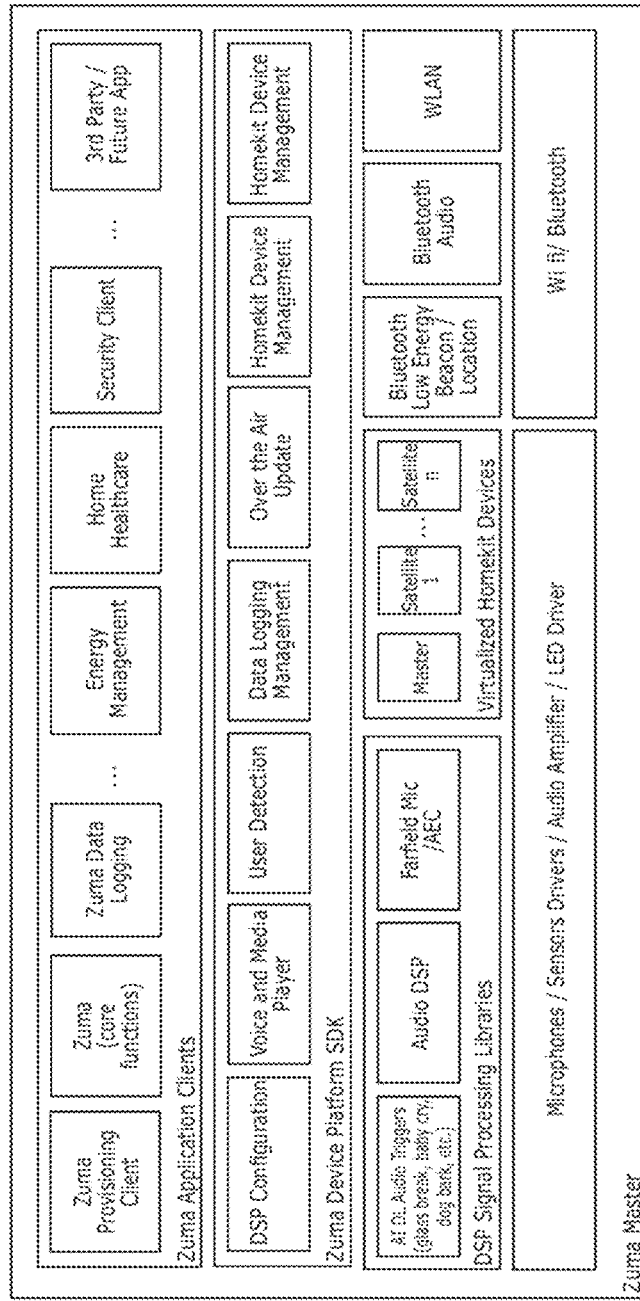
FIG. 14B shows a software architecture block diagram of a smart home device.

Development Roadmap
   Benchtop prototype
   Demo Rooms
   Technology/Partner Demonstrations
      PIR Sensor demo
      Audio Analytic—glass break, baby cry sensing
      XMOS farfield mic demo
      Panasonic IR Camera demo
      Homekit demo Room DSP Development System (same as demo room)
Non Form Factor Prototype (NonFF) V1
Non Form Factor Prototype (NonFF) V2
Pilot Prototypes
Engineering Validation Prototype
Design Validation Prototype
Benchtop Test Systems
FIGS. 13A and 13B illustrate example Benchtop Test Systems
Additional Optional Features
    Zuma Light and Sound (6" Retrofit)
        Head Unit
        Zuma Brain Cartridge (1 per room)
    Zuma TV/Audio
        Control and Power Module
        Zuma Brain Cartridge (1 per room)
    Zuma Light and Sensors
        Head Unit
        Control & Power Module
        Apple Homekit Adapter Cartridge
        Optional Sensor Extension Cartridges
            Camera Sensor Module
            Life Safety Sensor Module
            Home Hub Module
            Wifi Extender Module
Patent Update Topics
    Software Architecture
    Context aware command modifiers
    Contextual cues from sensor signals
    Multi-modal disambiguation
    Multi-modal user interfaces
    Group chat as primary UI mechanism
    Software Block Diagram
    Hardware Block Diagram
    Smart Bezel
    Fitting 4" & 6" ceiling cans for American market
    Ceiling mounting concepts
    Spoken Phrase Use Cases
Software Architecture
    FIGS. 14A and 14B illustrate the software architecture of an example Zuma system.
    Applications Platform
    Abstraction Layers
    Service Personalization
    Data Analytics/Learning
    Cloud System
        User Data (Secure, Anonymous)
        Zuma voice service
        3rd party voice service
        Device management
    Hardware System
Software Structure on Zuma Hardware
    Sensor event logging database
        Events have raw data and meta data calculated by sensor driver.
        Events can have pointers to multi-media data stored in mass storage in database.
        Events can specify types of processing. The driver determines the type of processing and this is provisioned under dynamic control of driver.
            Local to Zuma that has sensors
            On master
            Pass through for cloud event processing
        Encryption of data using "User" private keys.
        Data logging into local mass storage for asynchronous bulk upload.
        Events can be flagged for immediate upload to cloud service for almost real time processing in the cloud.
    Permissions based brokered local data access service
        Rule based, user provisioned keys to a limited set of data to enable local events processing.
        Accesses secure sensor event logging database.
        Events that are permitted are passed onto local events bus.
    Multi-protocol event processing/broker service.

Existing systems tend to be purpose built and if there is dynamic loading of functions these tend to be limited to firmware updates. The flexibility of the driver and event based logging allows flexible, dynamic, secure and reconfigurable system with ability to implement actions locally on hardware in the home as well as in cloud system.

The purpose of this service (module) is to allow for interoperability of local IoT/home control protocols. As an initial strategy, Zuma will adopt Apple Homekit as a robust means for customization of Homekit control. The function of the "Homekit Device Management" primarily occurs on the host hardware. However the state and function should ideally also be available outside of the home network. As a consequence an analogous "Homekit Device Management" module should exist and be synchronized with its device counterpart. Similarly other functions/applications have a similar structure to bridge hardware and cloud.

For certain functions on Zuma will bypass Homekit functions to improve the user interface performance (bandwidth of user controls sensing) to deliver responsive control of light brightness/dimming and audio volume up/down. This event processing service will further enable events and data from other home control systems to mirror the state of all systems. The challenge to do this kind of service is that the representations of data and events differ in architecture across different implementations. This service is a key differentiated feature of Zuma.

Zuma event bus and database will be optimized to replicate home control state across all connected systems with the aim that this one state representation will be used to control a particular installation.
    Common state and event database
    Drivers (dynamically provisioning and initialization)
        Apple home kit event driver
        Alexa event driver
        Google home event driver
        Samsung SmartThings event driver
    Events can come from the local device, satellites or master, or from the cloud.
    Scene interface API
    Exposes to the Zuma system, controls and data for dynamically create scenes across multiple platforms.
    For example this will allow scenes created in Homekit to be invoked on Zuma from an Android application.
    Key concept IP: Homekit scenes will be defined using the homekit system (via the Apple homekit toolkit and will require an apple iOS application to configure). However, once a scene has been named and exposed through this Scene interface any Zuma connected service (Alexa skill, Google home action, Samsung SmartThings event) will be able to invoke a named scene in Homekit. Initially only Homekit will be enabled but in the future it will be possible to provision other scene building systems.
    To the extent that Homekit is compatible with other home install (CEDIA market) systems like control4 and others, these will also be able to access these programmed scenes.

Zuma Cloud
    Zuma Applications Platform
        Zuma Phone/Web Apps
        Zuma Commercial Offers App
        Zuma App Platform SDK
        Energy Management
        Home Healthcare
        Security
        3rd Party/Future App
    Zuma Phone/Web Apps
    Service Personalized Data Offers/Partner API
    Service Personalization Rules from Community
    Zuma Skills
    3rd Party Skills
    Zuma 3rd Party Skills
    Zuma User Data
        User Pref/Permissions Based Data Broker
        Secure and Private User Data Store
        Anonymized User Data Store
        Personalization Rule Store
            Global rules for responding to events
            Local rules for responding to events
            Global rule/action masking if pre-empted by local rule/action
        Anonymized User Data Processing
        Behavior Analysis and Learning
    3rd Party Voice Services
        Alexa
        Google
    Zuma Voice Service
    3rd Party Services
    Device Management Layer
Software Structure in Cloud
    There is an analogous structure in the cloud software structure to the Zuma hardware. This analog exists for several reasons: some of the voice control services (like Alexa) use cloud application "skills" to implement control logic that might be otherwise running on the Zuma hardware software. Other remote control signals, like ones from mobile phones that are not present on the home network may also require analogous processing. In addition to the analog processing, the data logged from each Zuma system needs to be securely stored with user permissions yet accessible via specialized brokers to facilitate cloud based user centered actions and cloud based data processing, event detection and permissions based third party data mining. As show in in the diagram there is a hierarchical stack of services that operates in the Zuma cloud structure to deliver these functions.
    Real time events processing
    Secure data logging
    Permissions based cloud data access service
Zuma Master
    Zuma Application Clients
        Zuma Provisioning Client
        Zuma (core functions)
        Zuma Data Logging
        Energy Management
        Home Healthcare
        Security Client
        3rd Party/Future App
    Zuma Device Platform SDK
        DSP Configuration
        Voice and Media Player
        User Detection
        Data Logging Management
        Over the Air Update
        Homekit Device Management
    DSP Signal Processing Libraries
        AI/DL Audio Triggers (glass break, baby cry, dog bark, etc.)—this is an example of a third party library. Deep learning may be performed on audio signals and used to identify events in the home. This can also be applied to other sensor data. In some cases, sensor data from different sensors can be combined to identify particular events. These systems can be described generically as filters that evaluate a current data state and then output a result that can then be used as a trigger for another action. This general logical structure is analogous to a typical Artificial Intelligence "production systems" which contains many rules that fire when a left hand side (matches a condition) and then a right hand side task (action). In the configuration the filter can be a statistical model, deep learning runner and other heuristics that include weighting from statistical analysis of the general data set.
        Audio DSP
        Farfield Mic/AEC
    Virtualized Homekit Devices
        Master
    Bluetooth Low Energy Beacon/Location
    Bluetooth Audio
    WLAN
    Microphones/Sensors Drivers/Audio Amplifier/LED Driver
    Wifi/Bluetooth
Context Aware Command Modifiers
    Contexts are logical combinations of probabilities calculated from sensor data using a plurality of techniques.
    Techniques: statistical analysis, deep learning methods.
    Context is combined with voice and UI commands to modify actions.
    For example if there is high probability a person is in the room then the music playback will be switched to that person.
Multi-Modal Disambiguation
    In the case of context aware command modifiers it may be the case that there is not a high enough probability to make a decision.
    In this case it may be helpful to send a query to the user via the available channels of communication.
    For example if it is not clear who is in the room and music play command is issued, the system may inquire who's playlist to play to disambiguate the action.
Multi-Modal User Interfaces
The user interface to the home will occur in multiple modes
    Voice
    Light switch
    Mobile phone application
    Motion and context
    The system will allow for seamless transition back and forth between the various modalities of interaction. For example a "dialog" modality will keep a shared history of communication with the house both verbal and written on the mobile phone interface. All actions taken will be logged using the common terminology that is understood by the house.
    Group Chat As Primary UI Mechanism
        The system will facilitate dialog between household members around events that occur. The house will make household members aware of events around the house both while they are home and away. When an event occurs the household members are notified and then discuss what is happening. The system suggests and offers actions to take around the event. For example, if someone rings the doorbell someone can talk to the person at the door, or if the dog is barking a telephone call to the home can be made to soothe the dog.

Figure 15:
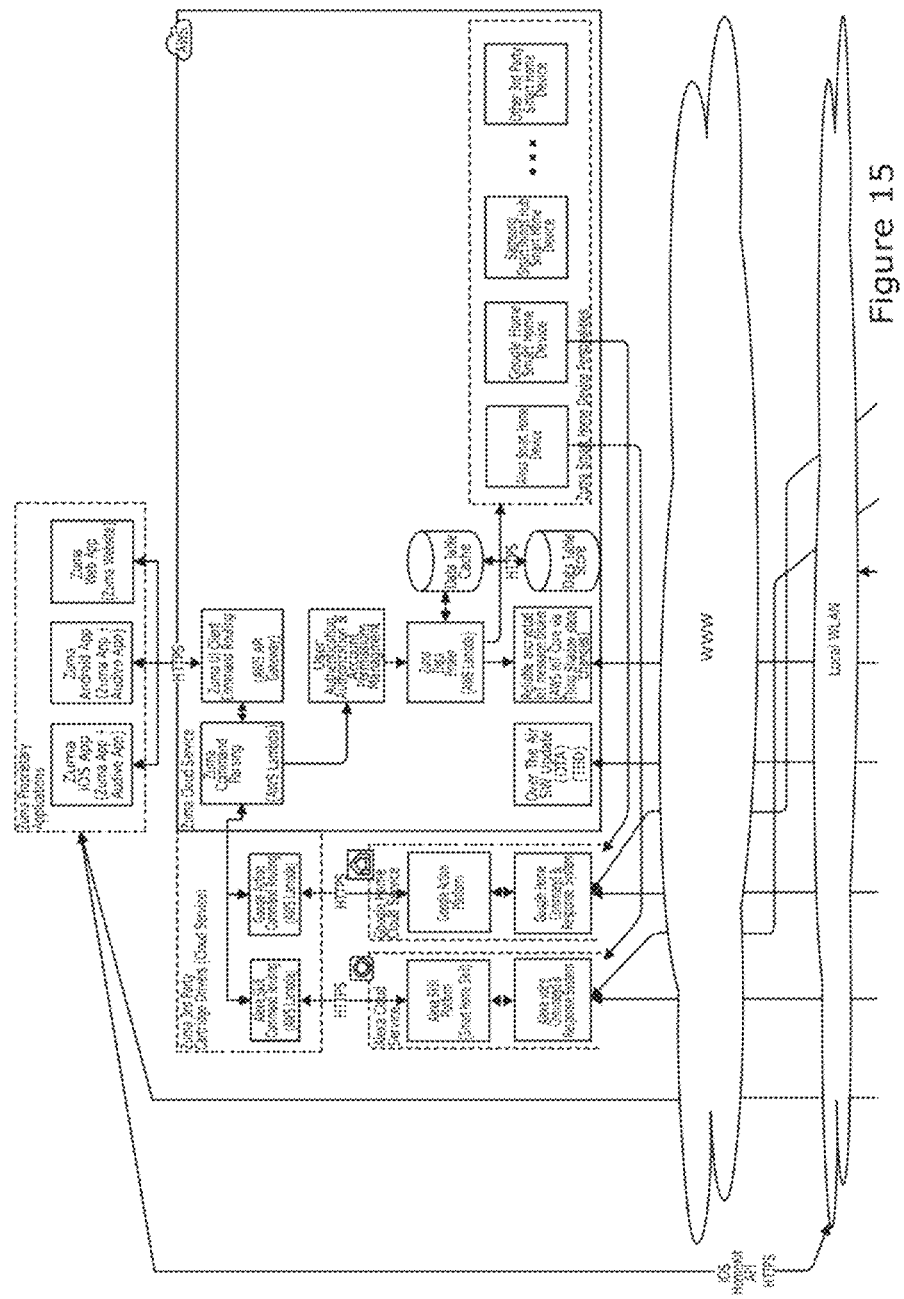
FIG. 15 shows a software block diagram of a smart home system and cloud service.
Figure 15:
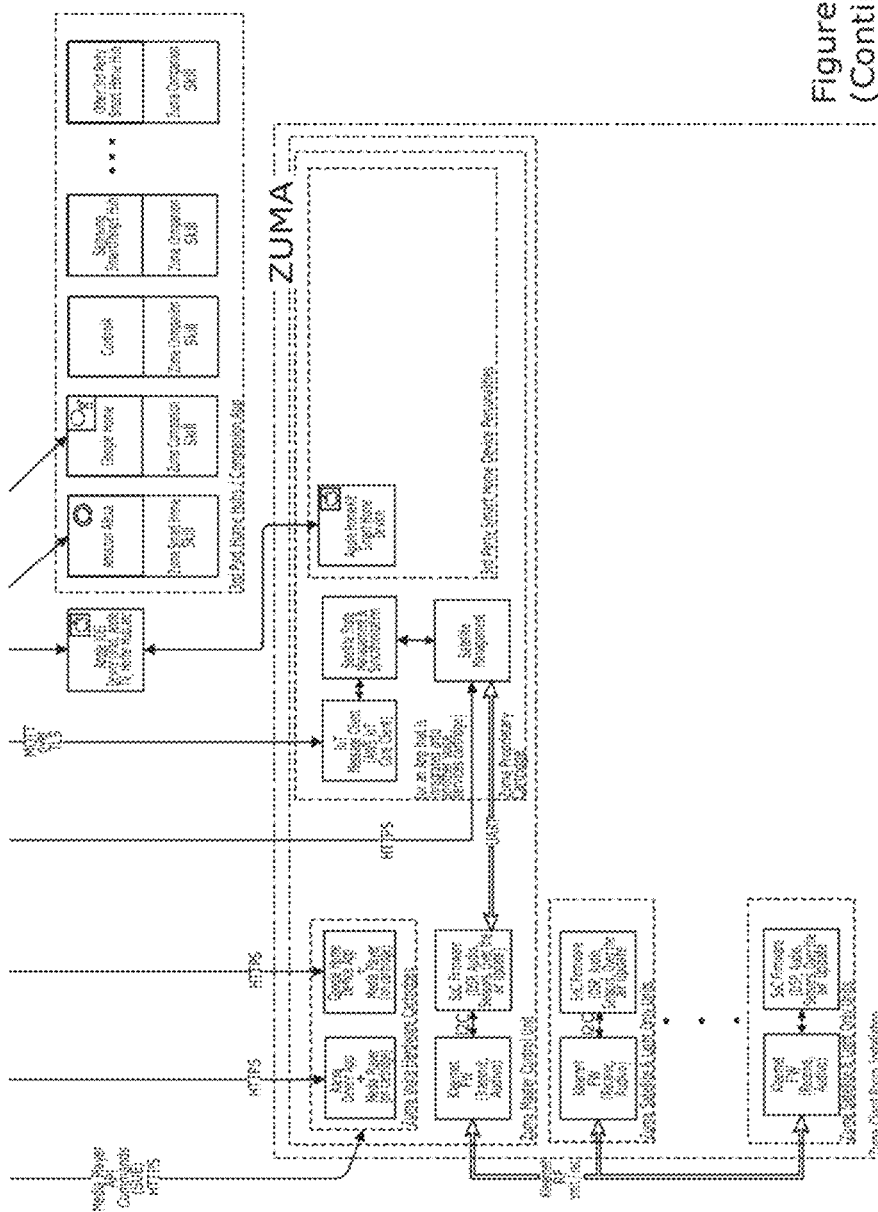

Software Block Diagram
   Elaboration on Architecture
   Embodiment using AWS
   Embodiment using Hardware
      Master & Satellite FIG. 15 illustrates a software block diagram of an example Zuma system.

FIGS. 15A, 15B and 15C show parts of FIG. 15 in greater detail.

AWS=Amazon Web Services;
IoT=Internet of Things
SoC=System-on-Chip

Figure 16:
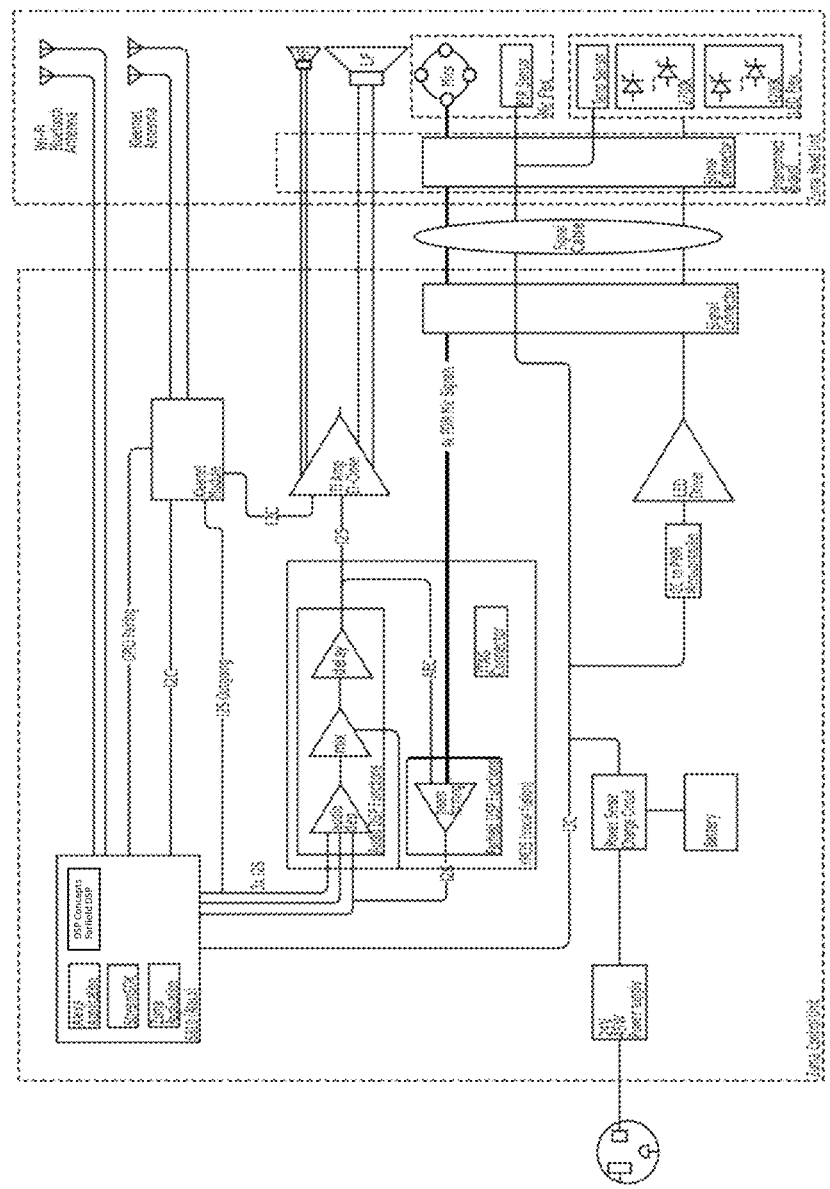
FIG. 16 shows schematic hardware diagrams of a master and satellite smart home device.
Figure 16:
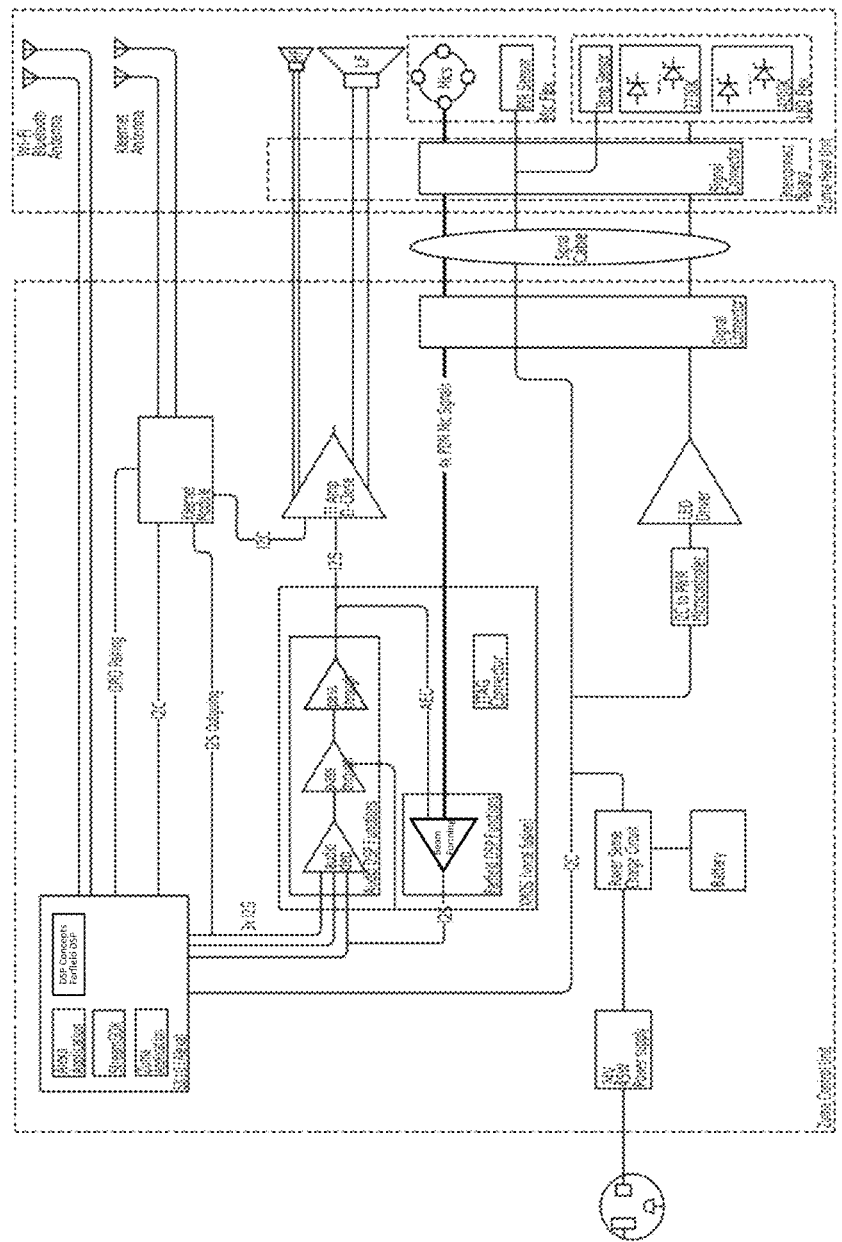

The Zuma system provides updated system architectures, as shown in the hardware diagrams for:

Zuma Master
   FIG. 16 shows schematic hardware diagrams of a master and satellite smart home device. FIGS. 16A and 16B show parts of the schematic hardware diagram of a master smart home device in more detail.

Zuma Satellite
   FIGS. 16C and 16D show parts of the schematic hardware diagram of a satellite smart home device in more detail.

Figure 17:
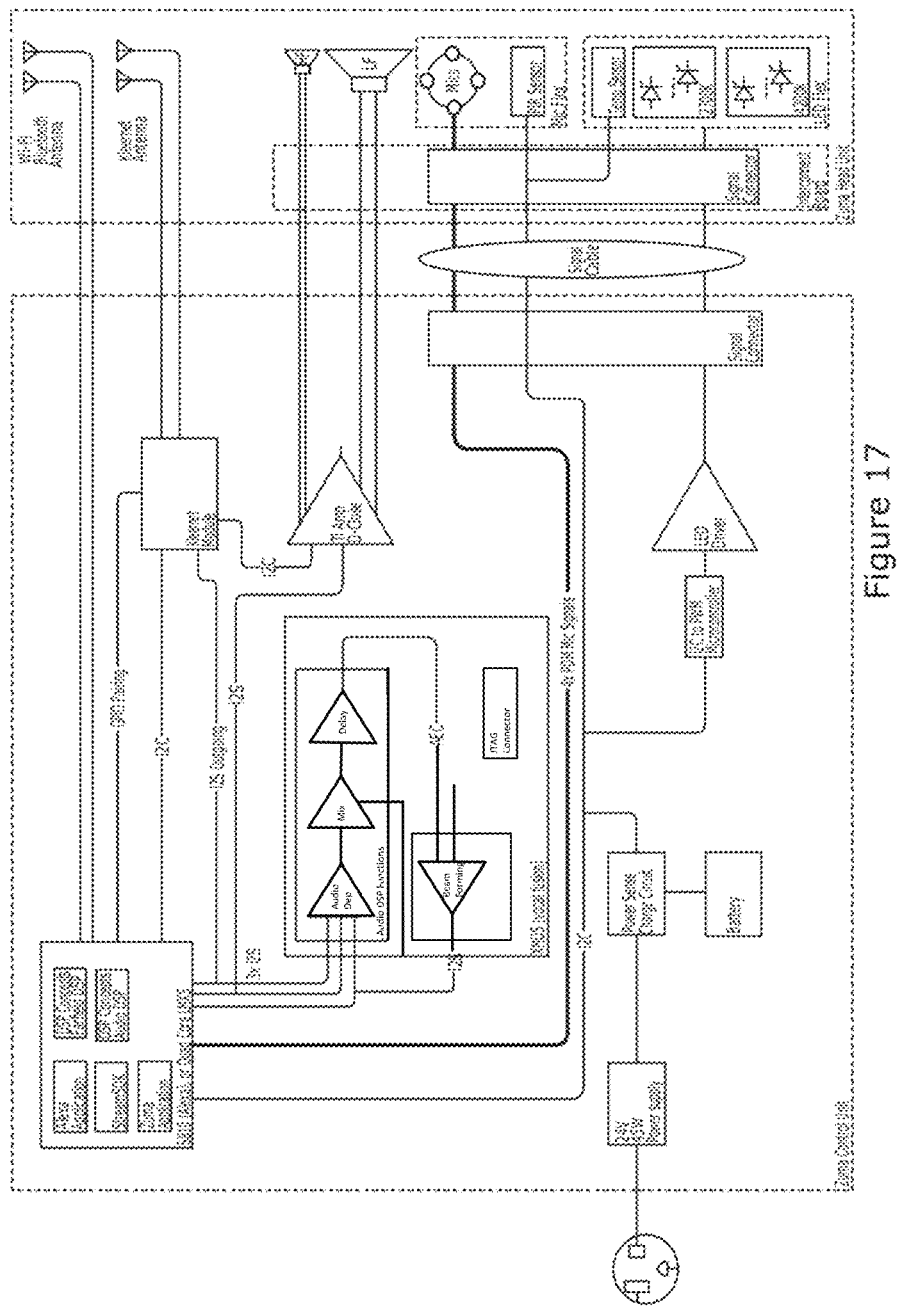
FIG. 17 shows a schematic hardware diagrams of another master smart home device.

Integration of all DSP onto SOC
   FIG. 17 shows a schematic hardware diagram of another example master smart home device. FIGS. 17A and 17B show parts of FIG. 17 in more detail.

In particular the one that gives the most advantage is the merging of the DSP hardware into software that runs on the SoC core. This implies that we now have an SoC on every unit. This increases unit volumes and functional capabilities of the entire system.

Some use cases:
General
   Automatic provisioning
   Play audio in whole house
   Zuma always play best audio quality on Spotify
   Identify user and play their Spotify
   Existing light switches, graceful shut down.
   Toggling on and off light switches.
Kitchen
   Recognize kitchen activities
   See stove left on.
Living room
   listening scenarios (people at a party, ambient sound, listening to news etc)
Media room
   specific requirements related to multi-media audio. Surround sound (5.1, 8.2, spatialization)
Retail
   Audio directed and tracking specific consumers as they move through the retail space, ambient audio, far-field microphone arrays used to capture specific consumer inquiries.
"Aging in place"
   detection of presence at specific times, detection of activities, detection of emergency events.

Figure 18A:
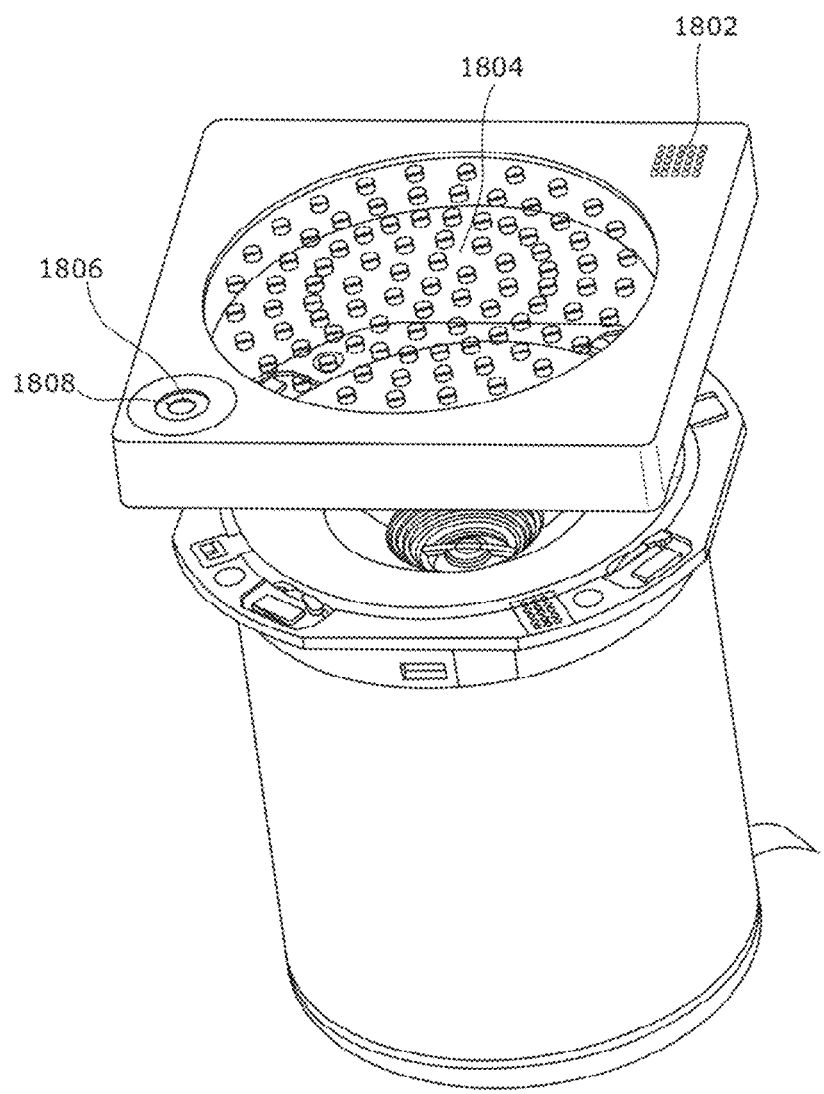
FIGS. 18A and 18B show isometric views of a smart home device comprising a sensor module and a light and/or loudspeaker fitting with the sensor module not coupled to the light and/or loudspeaker fitting.
Figure 18B:
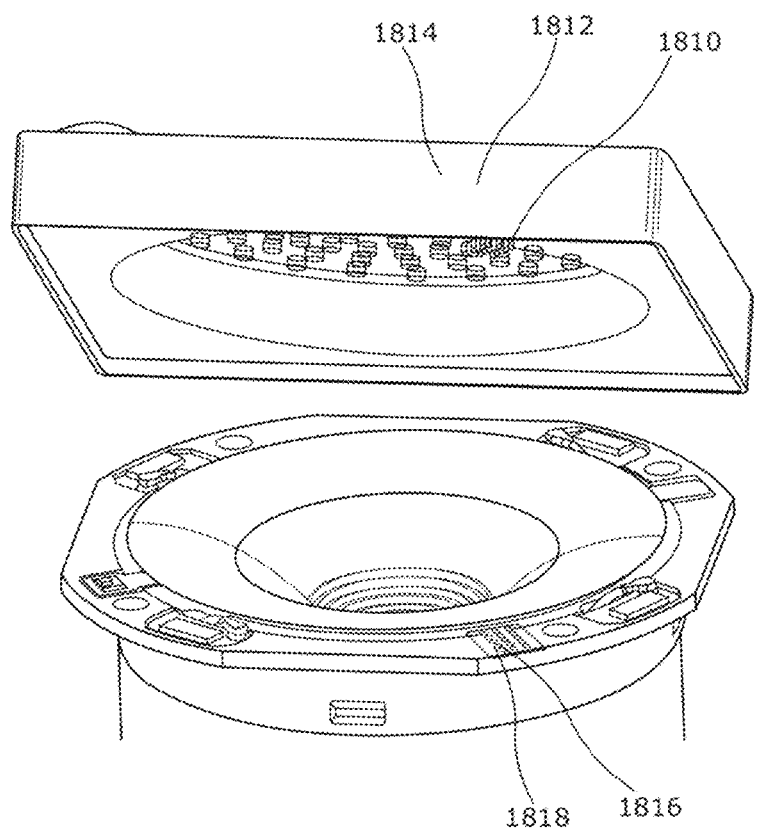

FIGS. 18A and 18B show isometric views of a smart home device comprising a sensor module and a light and/or loudspeaker fitting with the sensor module not coupled to the light and/or loudspeaker fitting. The device includes gas sensors 1802, a grille 1804 through which audio and light can pass, a fish eye lens 1806 and a conventional CMOS camera or infrared camera 1808. The device includes smart bezel connector pins 1810, printed circuit board inside 1812, USB controller inside 1814, smart bezel electrical contacts 1816 and connection to system on-chip (SOC) 1818.

Fitting 6" & 4" Ceiling Cans For American Market
   6"—retro fits into a standard 6" new build can.
   6"—Add a additional ring light around the GU10 fitting.
   6"—Make a frame to hold the PSU, GU10 and light ring.
   4"—redesign to make speaker enclosure smaller . . . reduce power and light capacity to fit. Roadmap.

Ceiling Mounting Concepts
   Add from work on bayonet.
   Zip tie clamping mechanism in conjunction with bayonet
   One move push in mechanism.

Template
   Description & Applications
   Drawings
   Electronics
   Software Diagram Whilst some specific use cases and particular implementations are described in this document, the invention may be implemented and used in a variety of ways.

Whilst the term "smart bezel" is used throughout this application, the skilled person will appreciate that the sensor module may be arranged to be in communication with the light/loudspeaker fitting in different ways.

The system may comprise a number of different light/loudspeaker fittings. Some of these may include only lighting elements, some may include only loudspeaker elements and some may include both lighting and loudspeaker elements.

The invention claimed is:

1. An electronic device, comprising:
a light and loudspeaker fitting, the light and loudspeaker fitting comprising:
   a lighting component comprising a light source configured to output light;
   a loudspeaker comprising a loudspeaker driver configured to output acoustic sound;
   a sensor data input interface; and
   a processor, and
a sensor module comprising:
   a grille configured to at least partially cover a front surface of the loudspeaker driver while passing the acoustic sound through the grille;
   a sensor data output interface; and
   one or more sensors, wherein the light and loudspeaker fitting and the sensor module comprise complementary fasteners configured to detachably couple the sensor module to the light and loudspeaker fitting so that the sensor data output interface of the sensor module is in communication with the sensor data input interface of the light and loudspeaker fitting when the sensor module is coupled to the light and loudspeaker fitting, so as to form a sensor interface between the sensor module and the light and loudspeaker fitting,
   wherein the sensor module is configured to transmit sensor data from the one or more sensors to the processor of the light and loudspeaker fitting via the sensor interface when the sensor module is coupled to the light and loudspeaker fitting,
   wherein the sensor module is configured to pass the output light through the sensor module, and
   wherein at least a portion of the one or more sensors and the grille are located on an outer surface of the electronic device and at least the portion of the one or more sensors is adjacent to and external to an outer-diameter surface of a region in the grille that includes holes to pass the acoustic sound.

2. The electronic device of claim 1, wherein the sensor module further comprises a second processor; and wherein the second processor of the sensor module comprises a data analysis framework comprising one or more data processing modules configured to analyze the sensor data.

3. The electronic device of claim 2, wherein the data analysis framework further comprises a provisioning interface;

wherein the data analysis framework is configured to receive instructions to update the data processing modules via the provisioning interface, wherein on receiving the instructions to update the data processing modules, the data analysis framework is configured to perform one or more operations comprising:

updating one or more of the data processing modules;

adding one or more additional data processing modules to the one or more data processing modules; or removing one or more of the data processing modules from the data analysis framework.

4. The electronic device of claim 1, wherein the light and loudspeaker fitting further comprises a network communication module configured to communicate with:

a network router; or a network communication module of another instance of the electronic device in a system.

5. The electronic device of claim 1, wherein the sensor data input interface of the light and loudspeaker fitting comprises a physical connector;

wherein the sensor data output interface of the sensor module comprises a second physical connector; and wherein the sensor data output interface of the sensor module is in physical and electrical communication with the sensor data input interface of the light and loudspeaker fitting when the sensor module is coupled to the light and loudspeaker fitting.

6. The electronic device of claim 1, wherein the complementary fasteners are configured to couple the sensor module to the light and loudspeaker fitting so that the sensor data output interface of the sensor module is in physical alignment with the sensor data input interface of the light and loudspeaker fitting.

7. The electronic device of claim 1, wherein the light and loudspeaker fitting is configured to supply power to the sensor module when the sensor module is coupled to the light and loudspeaker fitting.

8. The electronic device of claim 1, wherein the light and loudspeaker fitting is configured to send control signals to the sensor module via the sensor interface when the sensor module is coupled to the light and loudspeaker fitting.

9. The electronic device of claim 1, wherein the sensor interface comprises: a universal serial bus, USB, interface or an Ethernet interface.

10. The electronic device of claim 1, wherein the sensor module is configured to send an identifier to the light and loudspeaker fitting when the sensor module is coupled to the light and loudspeaker fitting; and wherein the light and loudspeaker fitting is configured to determine information relating to the one or more sensors in the sensor module based on the identifier.

11. The electronic device of claim 1, wherein the one or more sensors comprises one or more of: a microphone, a directional microphone, a microphone array, a smoke sensor, a fire sensor, a gas sensor, a carbon monoxide sensor, a temperature sensor, a lighting color sensor, a motion sensor, a video camera, or an infra-red camera.

12. The electronic device of claim 1, wherein the sensor module comprises a bezel that surrounds the lighting component and the loudspeaker of the light and loudspeaker fitting when the sensor module is coupled to the light and loudspeaker fitting.

13. The electronic device of claim 1, wherein the sensor module further comprises second lighting components that are controllable by the light and loudspeaker fitting via the sensor interface when the sensor module is coupled to the light and loudspeaker fitting.

14. The electronic device of claim 1, wherein the sensor module further comprises a physical interface port; and wherein communications received at the physical interface port are relayed to the processor of the light and loudspeaker fitting via the sensor interface when the sensor module is coupled to the light and loudspeaker fitting.

15. The electronic device of claim 1, wherein the one or more sensors are configured to transmit the sensor data when the sensor module is coupled to the light and loudspeaker fitting.

16. The electronic device of claim 1, wherein the lighting component comprises multiple light sources arranged in a centro-symmetric configuration relative to the loudspeaker driver.

17. The electronic device of claim 1, wherein the complementary fasteners comprise one or more magnetic elements on the sensor module or light and loudspeaker fitting; and wherein the one or more magnetic elements are configured to operate with one or more corresponding magnetic elements on the light and loudspeaker fitting or the sensor module.

18. The electronic device of claim 1, wherein the one or more sensors are other than a touch sensor.

19. A system, comprising:

multiple electronic devices, wherein a given electronic device comprises:

a light and loudspeaker fitting, the light and loudspeaker fitting comprising:

a lighting component comprising a light source configured to output light;

a loudspeaker comprising a loudspeaker driver configured to output acoustic sound;

a sensor data input interface; and a processor, and a sensor module comprising:

a grille configured to at least partially cover a front surface of the loudspeaker driver while passing the acoustic sound through the grille;

a sensor data output interface; and one or more sensors, wherein the light and loudspeaker fitting and the sensor module comprise complementary fasteners configured to detachably couple the sensor module to the light and loudspeaker fitting so that the sensor data output interface of the sensor module is in communication with the sensor data input interface of the light and loudspeaker fitting when the sensor module is coupled to the light and loudspeaker fitting, so as to form a sensor interface between the sensor module and the light and loudspeaker fitting, wherein the sensor module is configured to transmit sensor data from the one or more sensors to the processor of the light and loudspeaker fitting via the sensor interface when the sensor module is coupled to the light and loudspeaker fitting, and wherein the sensor module is configured to pass the output light through the sensor module, and wherein at least a portion of the one or more sensors and the grille are located on an outer surface of the electronic device and at least the portion of the one or more sensors is adjacent to and external to an outer-diameter surface of a region in the grille that includes holes to pass the acoustic sound.

20. The system of claim 19, wherein the multiple electronic devices comprise:

a first electronic device; and a second electronic device;

wherein the processor of the light and loudspeaker fitting of the first electronic device further comprises:

a data analysis framework comprising one or more data processing modules, wherein a given data processing module is configured to analyze the sensor data received via the sensor interface of the first electronic device;

wherein the second electronic device is configured to transmit the sensor data received from the one or more sensors of the sensor module of the second electronic device to the first electronic device; and wherein the processor of the first electronic device is further configured to receive and analyze the sensor data transmitted by the second electronic device.

21. A method for providing light and outputting acoustic sound, comprising:

by an electronic device:

providing the light from a light source in a light and loudspeaker fitting in the electronic device;

outputting the acoustic sound from a loudspeaker driver in a loudspeaker in the electronic device; and passing the acoustic sound through a grille in a sensor module, wherein the grille at least partially covers a front surface of the loudspeaker driver, and wherein the sensor module is detachably coupled to the light and loudspeaker fitting;

passing the light through the sensor module; and transmitting sensor data from one or more sensors in the sensor module to a processor in the light and loudspeaker fitting via a sensor interface between a sensor data output interface of the sensor module and a sensor data input interface of the light and loudspeaker fitting when the sensor module is coupled to the light and loudspeaker fitting, wherein at least a portion of the one or more sensors and the grille are located on an outer surface of the electronic device and at least the portion of the one or more sensors is adjacent to and external to an outer-diameter surface of a region in the grille that includes holes to pass the acoustic sound.

* * * * *